import os
import sys
import json

(12) United States Patent 
Kikuchi

(10) Patent No.: US 9,324,164 B2
(45) Date of Patent: Apr. 26, 2016

(54) IMAGE ENCODING APPARATUS, IMAGE DECODING APPARATUS, IMAGE PROCESSING APPARATUS, AND CONTROL METHOD THEREOF DEALING WITH HIGH DYNAMIC RANGE IMAGE

(71) Applicant: CANON KABUSHIKI KAISHA, Tokyo (JP)

(72) Inventor: Tomoe Kikuchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/317,707

(22) Filed: Jun. 27, 2014

(65) Prior Publication Data

US 2015/0016735 A1 Jan. 15, 2015

(30) Foreign Application Priority Data

Jul. 11, 2013 (JP) ................................. 2013-145844
Mar. 11, 2014 (JP) ................................. 2014-048074

(51) Int. Cl.
*G06K 9/36* (2006.01)
*G06T 9/00* (2006.01)
*H04N 19/46* (2014.01)
*H04N 19/30* (2014.01)
*H04N 19/60* (2014.01)
*H04N 19/14* (2014.01)
*H04N 19/162* (2014.01)

(52) U.S. Cl.
CPC ..... *G06T 9/00* (2013.01); *H04N 19/14* (2014.11); *H04N 19/162* (2014.11); *H04N 19/30* (2014.11); *H04N 19/46* (2014.11); *H04N 19/60* (2014.11)

(58) Field of Classification Search
None
See application file for complete search history.

(56) References Cited

U.S. PATENT DOCUMENTS

| 7,058,078 | B2 | 6/2006 | Kikuchi .................... 370/465 |
| 8,514,934 | B2 | 8/2013 | Ward et al. ............... 375/240.03 |
| 2008/0175495 | A1* | 7/2008 | Segall ..................... 382/238 |
| 2008/0310501 | A1 | 12/2008 | Ward et al. .............. 375/240.02 |

FOREIGN PATENT DOCUMENTS

| JP | 2007-534238 A | 11/2007 |
| WO | WO 2005/104035 A1 | 11/2005 |

* cited by examiner

*Primary Examiner* — Chan Park
*Assistant Examiner* — Eueng-Nan Yeh
(74) *Attorney, Agent, or Firm* — Fitzpatrick, Cella, Harper & Scinto

(57) ABSTRACT

This invention makes it possible to detect only a relatively large mismatch while allowing a mismatch to some extent between an LDR image and HDR information, which are stored in a single file, caused by editing of the LDR image. An apparatus of this invention generates, from an input HDR image, an LDR image and difference information representing a difference between the LDR image and the HDR image. The generated LDR image is encoded. Information formed from data representing a local feature of the LDR image is calculated as LDR meta-data. The apparatus generates a file by storing the encoded data in a main encoded data storage region and storing the difference information and the LDR meta-data in a marker defined as a non-reference region for an LDR image decoding apparatus in the file structure.

20 Claims, 23 Drawing Sheets

FIG. 1A

| SOI |
|---|
| APP11 (HDR INFORMATION) ~101 |
| ESSENTIAL MARKER OF LDR ENCODED DATA ~102 |
| ENCODED DATA OF LDR IMAGE |
| EOI |

FIG. 1B

| SOI |
|---|
| APP11 (HDR INFORMATION + LDR META-DATA) |
| ESSENTIAL MARKER OF LDR ENCODED DATA |
| ENCODED DATA OF LDR IMAGE |
| EOI |

FIG. 1C

| SOI |
|---|
| APP11 (HDR INFORMATION) |
| APP11 (LDR META-DATA) |
| ESSENTIAL MARKER OF LDR ENCODED DATA |
| ENCODED DATA OF LDR IMAGE |
| EOI |

FIG. 1D

| SOI |
|---|
| APP11 (HDR INFORMATION + PART OF LDR META-DATA) |
| APP11 (PART OF LDR META-DATA) |
| ESSENTIAL MARKER OF LDR ENCODED DATA |
| ENCODED DATA OF LDR IMAGE |
| EOI |

FIG. 1E

| SOI |
|---|
| APP11 (EXIF) LDR THUMBNAIL IMAGE |
| APP11 (HDR INFORMATION + LDR META-DATA) |
| ESSENTIAL MARKER OF LDR ENCODED DATA |
| ENCODED DATA OF LDR IMAGE |
| EOI |

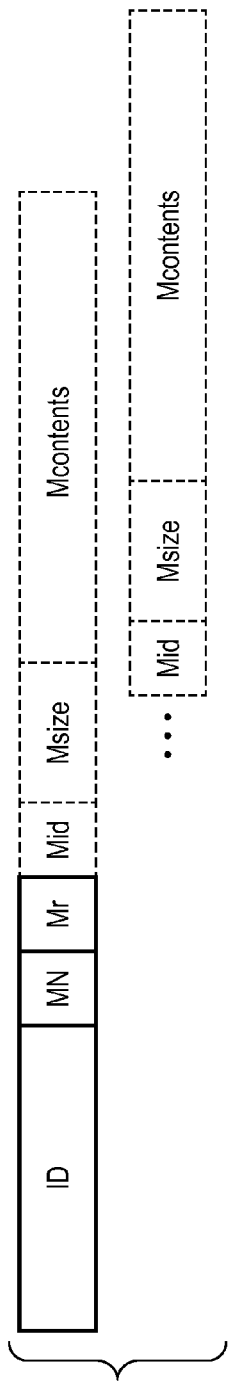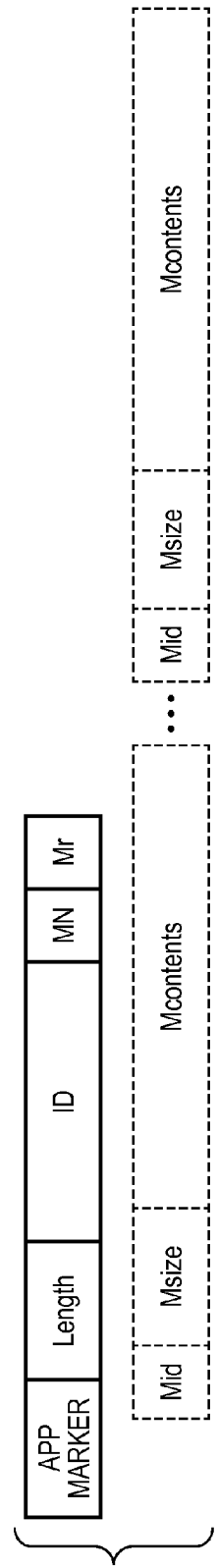

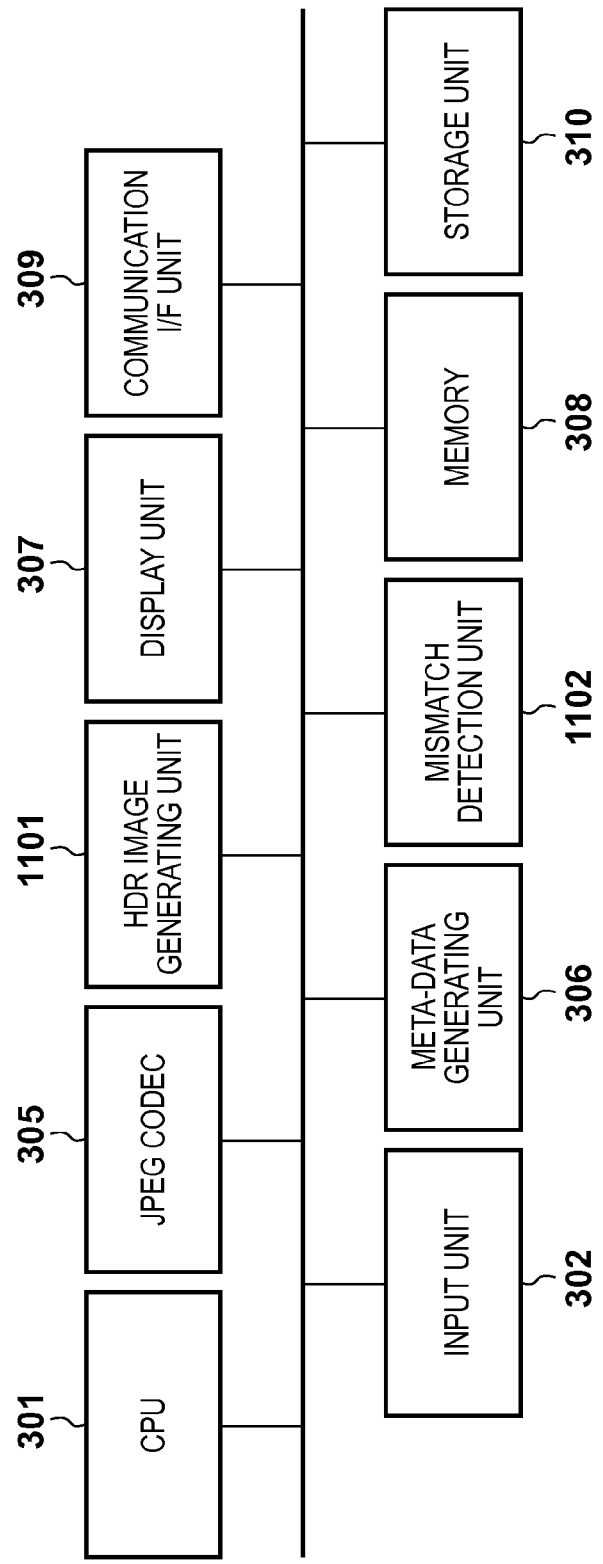

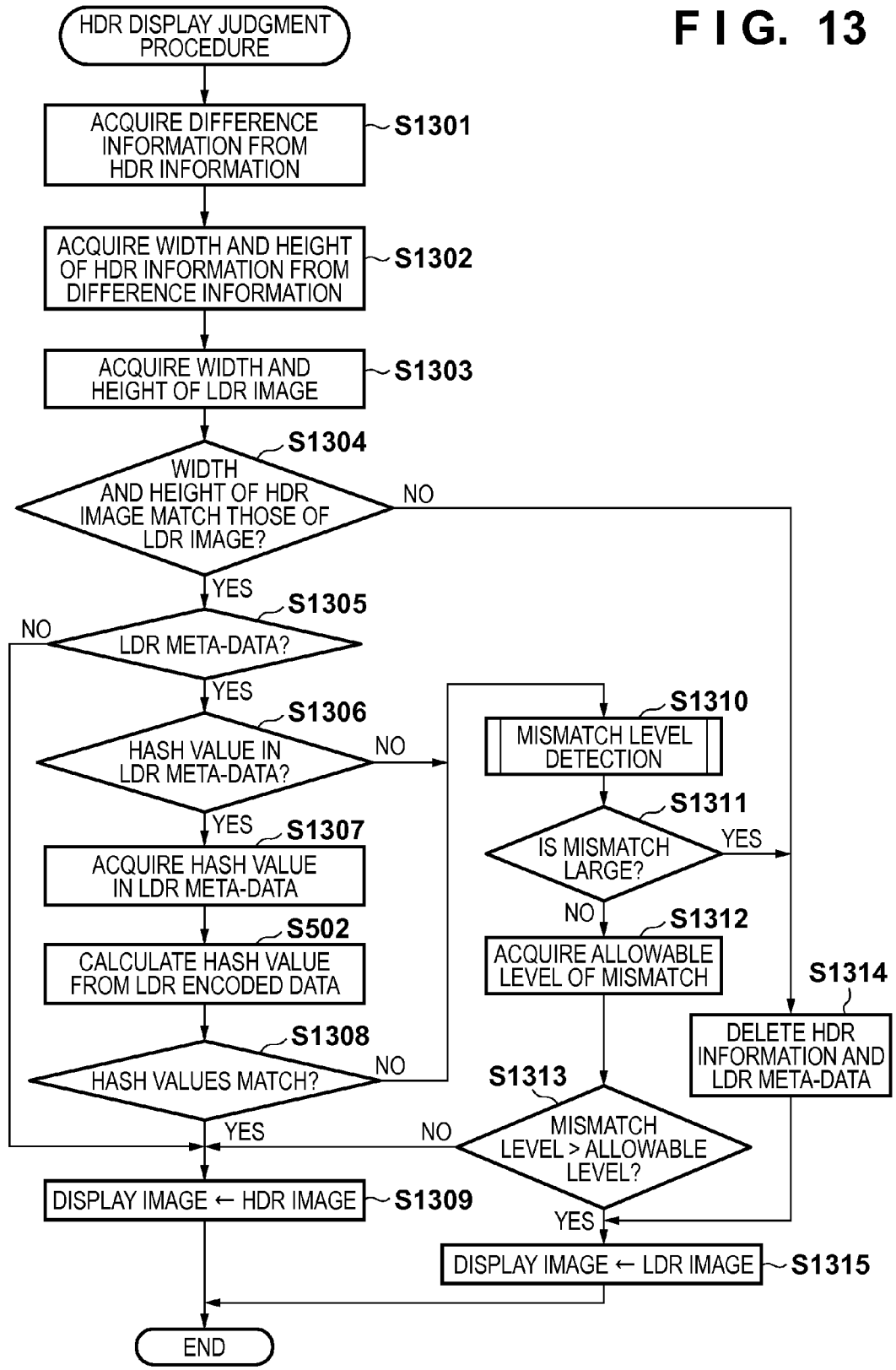
F I G. 13

FIG. 18A

LDR IMAGE AND HDR INFORMATION DO NOT MATCH. DEGREE OF DIFFERENCE CANNOT BE DETECTED. DISPLAY HDR?

[Yes] [No]

FIG. 18B

LDR IMAGE AND HDR INFORMATION DO NOT MATCH. DEGREE OF DIFFERENCE IS LARGE TO SOME EXTENT. DISPLAY HDR?

[Yes] [No]

FIG. 18C

LDR IMAGE AND HDR INFORMATION DO NOT MATCH. DEGREE OF DIFFERENCE IS SMALL. DISPLAY HDR?

[Yes] [No]

FIG. 18D

LDR IMAGE AND HDR INFORMATION DO NOT MATCH. DEGREE OF DIFFERENCE IS VERY LARGE, AND HDR DISPLAY IS DIFFICULT. DELETE HDR INFORMATION AND STORE LDR IMAGE?

[Yes] [No]

FIG. 18E

LDR IMAGE AND HDR INFORMATION DO NOT MATCH. DEGREE OF DIFFERENCE IS MEDIUM. DISPLAY HDR?

[Yes] [No]

FIG. 18F

SINCE LDR IMAGE AND HDR INFORMATION DO NOT MATCH, LDR IMAGE WILL BE DISPLAYED. DELETE HDR INFORMATION?

[Yes] [No]

IMAGE ENCODING APPARATUS, IMAGE DECODING APPARATUS, IMAGE PROCESSING APPARATUS, AND CONTROL METHOD THEREOF DEALING WITH HIGH DYNAMIC RANGE IMAGE

BACKGROUND OF THE INVENTION

1. Field of the Invention

The present invention relates to an image encoding technique.

2. Description of the Related Art

Still image data in various formats circulate today. A representative format is the JPEG compression format. Images of the JPEG compression format are also used as output files of digital cameras. There exist various kinds of software, including web browsers, capable of handling JPEG-compressed images. A JPEG-compressed still image has 8 bits per component. For this reason, only 256 tones can be reproduced per component.

On the other hand, human vision can recognize a contrast ratio up to 1:10,000. Hence, there is a large difference between an actual appearance and the tone expression of conventional JPEG images. Under these circumstances, an HDR (High Dynamic Range) image having data of about 32 bits per component has received attention.

Literature: Japanese Paten-Laid Open No. 2007-534238 discloses a technique that makes it possible to view an HDR image having data of 32 bits per component using a conventional JPEG viewer. According to this literature, an HDR image is tone-mapped to an LDR (Low Dynamic Range) image of 8 [bits/component] and JPEG-compressed. The ratio of the HDR image that is the original image to the LDR image is separately created as HDR information, and the HDR information and the JPEG-encoded data of the LDR image are stored in one file. The storage location of the HDR information is within a JPEG application marker (APP marker) (see FIG. 1A). A general JPEG viewer decodes an image without regard for an unsupported APP marker. For this reason, for example, if a JPEG viewer incapable of recognizing APP11 as a marker storing HDR information receives data shown in FIG. 1A, only an LDR image 102 is decoded and displayed. On the other hand, an HDR image viewer capable of recognizing that APP11 stores HDR information can decode and display the original HDR image by combining the LDR image 102 and information 101 in the APP marker.

Assume a case where a JPEG viewer has an image editing function. There are a lot of pieces of software for directly storing meta-data unrecognizable by the viewer itself when storing an edited image. Directly storing meta-data enables keeping compatibility with the device that has created the image.

For example, assume a case where a JPEG viewer having an image editing function decodes and edits only an LDR image in a file in which HDR image data has been stored by the method disclosed in the above literature, and encodes and stores the edited image together with HDR information in the unrecognizable APP marker. In this case, a match between the LDR image and the HDR information in the APP marker is lost.

Hash is usable to detect that image data has undergone editing. For example, a surveillance camera or the like uses a hash value by SHA-1 as image alteration detection data.

When decoding an HDR image, the degree of image quality degradation caused by mismatch between HDR information and an LDR image changes depending on the contents of editing to the LDR image.

When editing that results in a size or aspect ratio different from that of the original image, for example, cutout, enlargement, or 90-degree rotation is performed, even overlaying HDR information on the LDR image is difficult. When editing that changes the position of an object in the image, for example, vertical flip or horizontal flip is performed, an unnatural object or pattern such as ghost appears, resulting in a large difference from the original HDR image. When editing that changes the hue of an entire image, for example, converting an LDR image into a monochrome or sepia image is performed, the entire image is unnaturally color-tinted, greatly impairing the worth of an HDR image. Mismatch caused by these editing processes very largely affects decoding of an HDR image, and displaying an HDR image is not so worth.

On the other hand, mismatch caused by editing of a local region of an image concerning, for example, sharpness or shading of an edge portion has an influence to blur the edge portion when decoding an HDR image, though the image quality degradation does not greatly impair the worth of the HDR image. In one of HDR image creation methods, a plurality of images shot while changing brightness in a narrow dynamic range are overlaid, thereby obtaining an HDR image. In this case, since the edges of the plurality of images rarely fit exactly, processing of shading the edge portions is applied in general. That is, even if the edge portions blur due to mismatch between the LDR image and the HDR information, the worth of an HDR image is not largely impaired. Dust removal is also one of editing processes for a local region of an image. Dust removal is image processing of removing a small black point, which is formed when a dust particle sticking to the imaging plane is included in a shot image, by filling it with a peripheral color. In this case as well, when HDR information is overlaid on a point where a dust particle is removed in an LDR image, the dust particle existing in the original HDR image is only faintly recognizable, although color tint remains to some extent. This mismatch does not greatly impair the worth of an HDR image, either.

Mismatch caused by shading processing such as noise removal for an entire image using a filter of a small radius has no influence to largely impair the worth of an HDR image. When HDR information is overlaid on an LDR image after noise removal, the noise that should have been removed is faintly recognizable. However, the noise existing in the original HDR image as well has little influence. Changing only a compression condition, for example, a Q parameter rarely affects decoding of an HDR image.

As described above, the influence varies depending on the contents of editing to the LDR image.

SUMMARY OF THE INVENTION

The present invention has been made in consideration of the above-described situations, and provides a technique of detecting mismatch between an LDR image and HDR information caused by editing of the LDR image.

In order to solve the above problem, for example, there is provided an image encoding apparatus, comprising: an input unit configured to input the HDR image of an encoding target; a generating unit configured to generate, from the input HDR image, an LDR image and difference information representing a difference between the LDR image and the HDR image; an encoding unit configured to encode the LDR image generated by the generating unit; a calculating unit configured to calculate, as LDR meta-data, information formed from data representing a feature of the LDR image; and a file generating unit configured to generate an HDR encoded file by storing encoded data of the LDR image generated by the encoding unit in a main encoded data storage region of a file structure for the LDR image and storing the difference information and the LDR meta-data in a marker defined as a non-reference region for an LDR image decoding apparatus in the file structure.

According to the present invention, it is possible to detect mismatch between an LDR image and HDR information, which are stored in a single file, caused by editing of the LDR image. As a result, upon receiving an encoded file including an LDR image that may have been edited, a decoder can appropriately handle a decoded image.

Further features of the present invention will become apparent from the following description of exemplary embodiments (with reference to the attached drawings).

BRIEF DESCRIPTION OF THE DRAWINGS

FIGS. 1A to 1E are views of the storage positions of HDR information and LDR meta-data;

FIGS. 10A to 10D are views for explaining the output format of LDR meta-data;

FIG. 11 is a block diagram of an HDR image decoding apparatus;

FIG. 13 is a flowchart of an HDR display judgment procedure;

FIGS. 18A to 18F are views for explaining examples of dialogue display;

DESCRIPTION OF THE EMBODIMENTS

Embodiments of the present invention will now be described in detail with reference to the accompanying drawings.

First Embodiment

Figure 2:
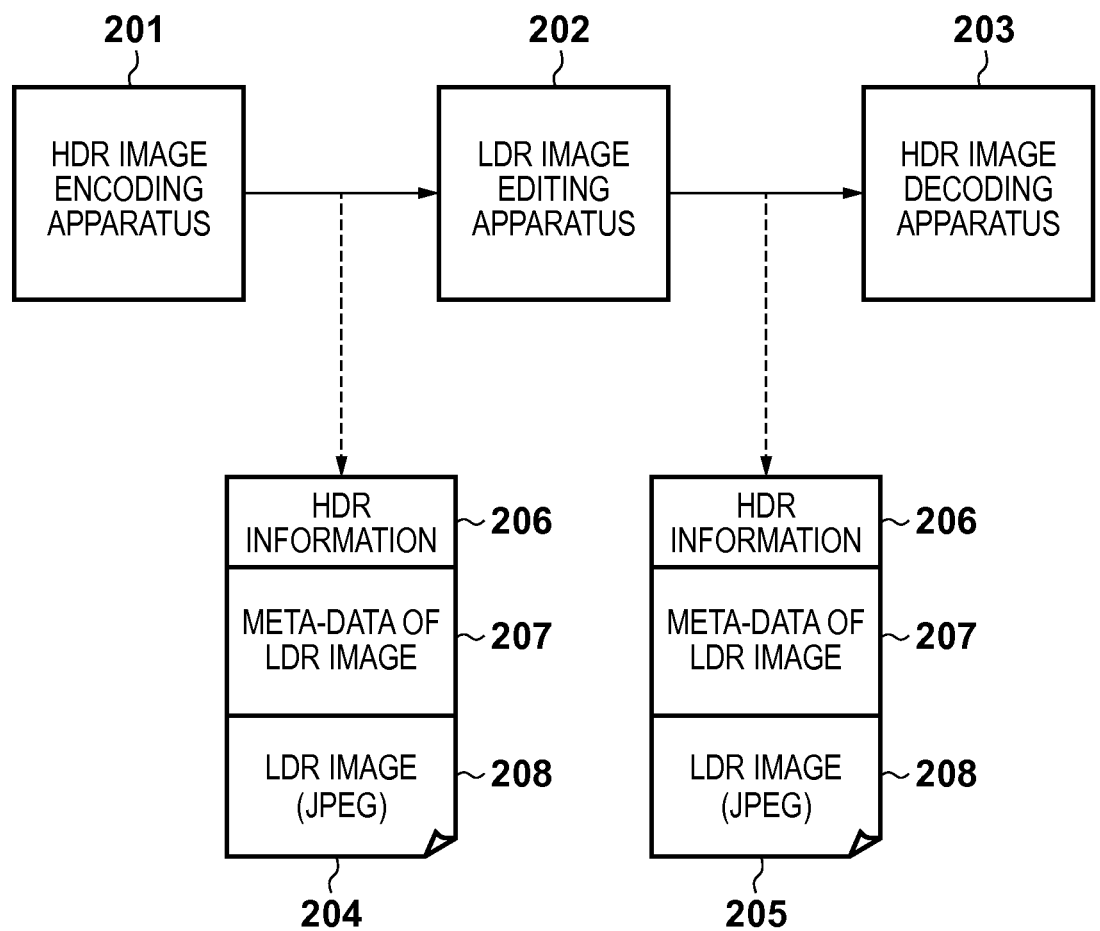
FIG. 2 is a block diagram of an image processing system.

FIG. 2 is a block diagram showing the schematic arrangement of a system for implementing this embodiment. This system includes an HDR image encoding apparatus 201, an LDR image editing apparatus 202, and a decoding apparatus 203 capable of reconstructing an HDR image, which are assumed to be connected via a network. The encoding apparatus 201 generates an LDR image 208 from HDR image data input from, for example, an image capturing device (not shown). The encoding apparatus 201 generates, from the LDR image 208, HDR information that is information necessary to generate an HDR image. The encoding apparatus 201 also creates meta-data 207 of the LDR image, encodes these data, and generates/outputs an HDR encoded file 204 in which the data are stored in this single file. The output HDR encoded file 204 is transmitted to the LDR image editing apparatus 202 via the network. The editing apparatus 202 decodes/edits the LDR image 208, and re-encodes the edited LDR image by JPEG. At this time, HDR information 206 and the meta-data 207 of the LDR image, which are stored in an APP marker (or non-reference area) that cannot be recognized by the editing apparatus 202, are directly copied to the APP marker of an edited LDR image 209. The editing apparatus 202 outputs an HDR file 205 in which the LDR image has been edited, and the HDR information 206, the meta-data 207 of the LDR image, and the edited LDR image 209 are stored in this single file. The HDR file 205 in which the LDR image has been edited is received by the HDR image decoding apparatus 203 via the network.

A description will be made assuming that the encoding target HDR image data according to this embodiment is RGB color data including 1,920×1,080 pixels, and each component (color) is represented by a real value of 16 bits. However, the present invention is also applicable to any components (for example, gray) other than RGB, and the type of color space and the number of components are not particularly limited. The number of bits of one component is not limited to 16 bits, and any number of bits such as 12 bits or 32 bits is usable as long as it is larger than 8 bits. Not only a real value but also an integer value of 16 bits or the like may be used. That is, the input image can have any format if it can express the contrast ratio of HDR.

<HDR Image Encoding Side: LDR Image Meta-Data Creation Method>

A method of creating the HDR file 204 in the HDR image encoding apparatus 201 will be described first.

Figure 3:
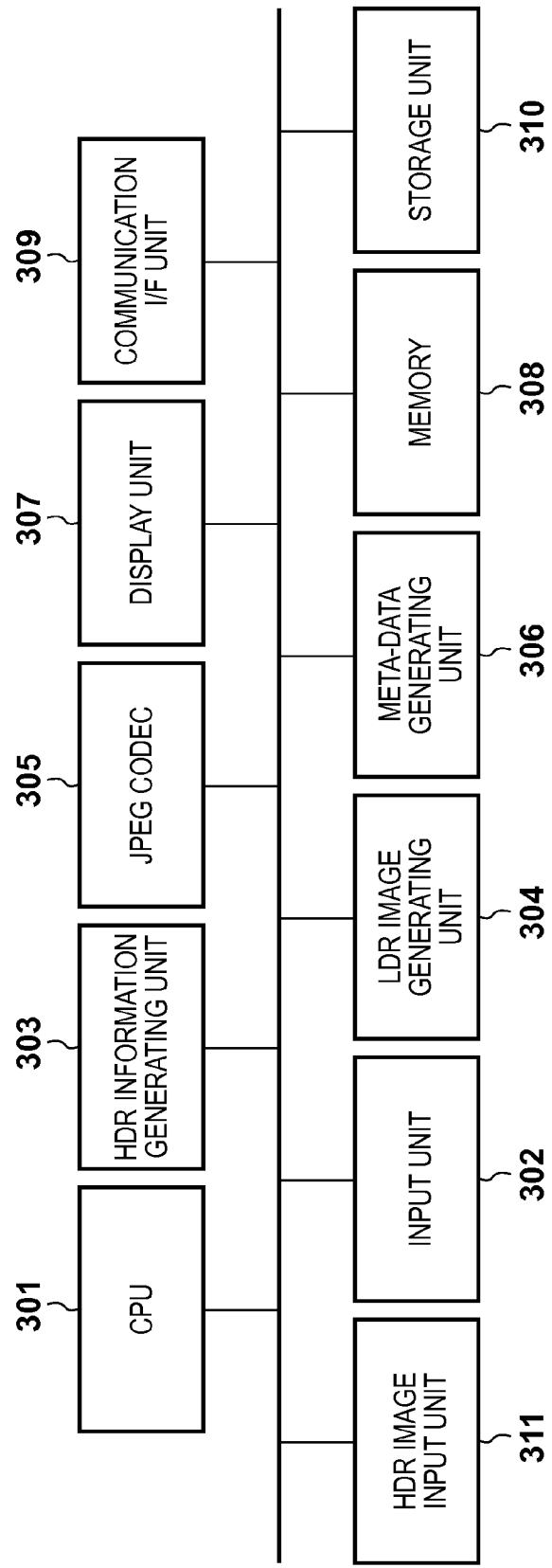
FIG. 3 is a block diagram of an HDR image encoding apparatus.

FIG. 3 is a block diagram of the HDR image encoding apparatus 201 according to this embodiment. Referring to FIG. 3, a CPU 301 controls the entire apparatus and is involved in all processes of the components. An input unit 302 is a portion that inputs an instruction from the user and includes a pointing system such as a keyboard and a mouse. Reference numeral 303 denotes an HDR information generating unit; 304, an LDR image generating unit; and 305, a JPEG codec that converts non-compressed image data having 8 bits per component into JPEG-encoded data, or decodes and converts JPEG-encoded data into non-compressed image data. A meta-data generating unit 306 generates meta-data representing features of an LDR image. A display unit 307 normally uses a liquid crystal display or the like. A memory 308 includes a ROM and a RAM, and provides programs, data, work area, and the like necessary for processing to the CPU 301. Reference numeral 309 denotes a communication I/F unit; and 310, a storage unit that is a portion configured to store image data, programs, and the like and normally uses a hard disk or the like. Control programs necessary for the processes of flowcharts to be described below are assumed to be stored in the storage unit 310 or the ROM of the memory 308. A program stored in the storage unit 310 is temporarily loaded to the RAM of the memory 308 and executed. An input unit 311 inputs an encoding target HDR image. The input source is an image capturing unit. However, it may be a storage medium storing an HDR image, and the type is not particularly limited. Note that although the system arrangement further includes various constituent elements other than those described above, they are not the gist of the present invention, and a description thereof will be omitted.

A method of separating the LDR image 208 and the HDR information 206 from HDR image data by the encoding apparatus 201 according to this embodiment will be described. Processing called tone mapping for compressing the dynamic range is performed for HDR image data, thereby generating 8-bit image data of low dynamic range (LDR). Since the LDR image is equivalent to an image having 8 bits per component, encoded data of the LDR image can be generated by JPEG compression. Then, HDR information necessary to return the LDR image data to HDR image data is generated and encoded. In addition, meta-data (LDR meta-data) of the LDR image data is generated from the encoded data of the LDR image and encoded. After that, an HDR file to be finally output is generated from these encoded data.

To generate HDR information, two methods are mainly usable. The first method uses difference information between LDR image data and HDR image data. JPEG-encoded data of an LDR image is temporarily decoded, and inverse tone mapping is performed to apparently decode HDR image data. Then, the difference between the original HDR image data and the HDR image apparently created from the LDR image is calculated, and the difference data is encoded as HDR information. Inverse tone mapping is processing of extending the dynamic range of an LDR image. The second method uses the brightness component ratio (Y ratio) of HDR image data and LDR image data. LDR image data is returned to the range of HDR using the Y ratio, and the difference of color difference components from original HDR image data is generated. The Y ratio and the color difference components are converted into 8-bit data to generate JPEG-encoded data.

In this embodiment, assume that HDR information is generated by the first method using difference information for the sake of descriptive simplicity. However, HDR information may be generated by the second method using brightness component ratio.

Figure 4:
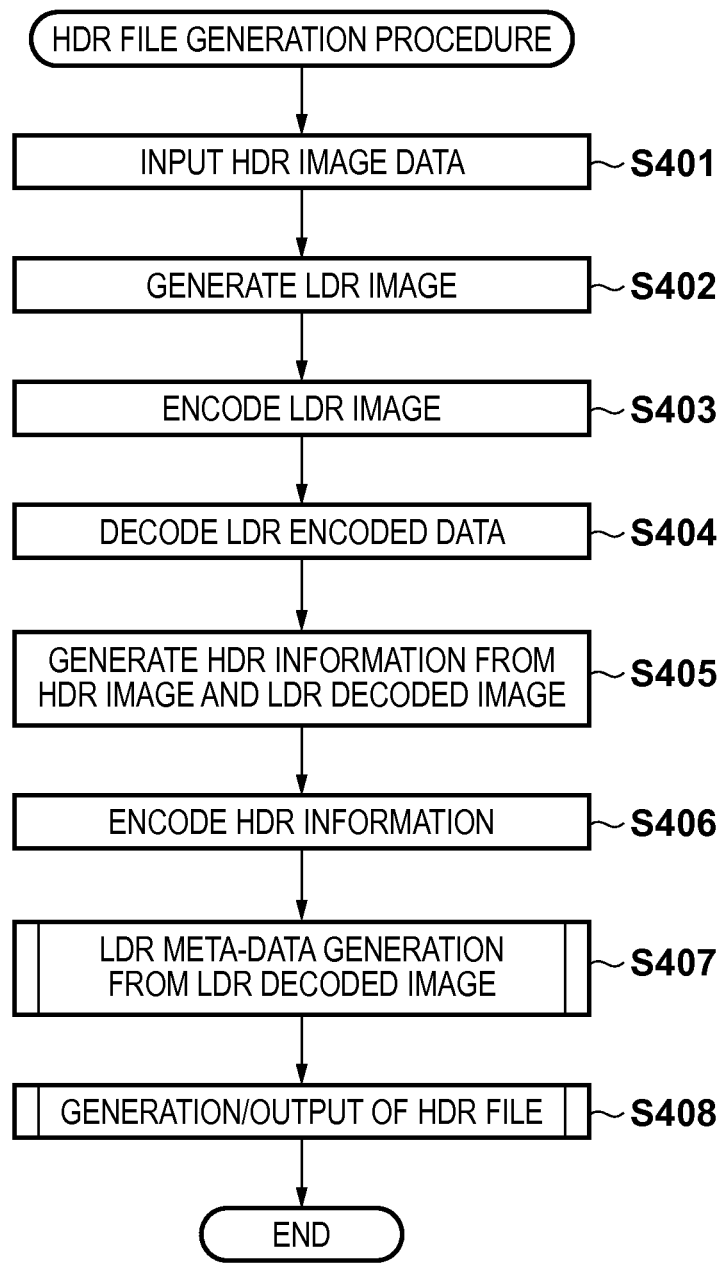
FIG. 4 is a flowchart of an HDR file generation procedure.

FIG. 4 is a flowchart showing the procedure of HDR file generation processing executed by the CPU 301 of the encoding apparatus 201. HDR file generation processing according to this embodiment will be described below with reference to FIG. 4.

In step S401, encoding target HDR image data is input from the HDR image input unit 311. In step S402, RGB data of the HDR image data input in step S401 is converted into YCbCr, and tone mapping is performed using tone curves acquired from the memory 308. As a result, LDR image data having 1,920×1,080 pixels like the original HDR image is generated. Tone mapping is processing of compressing an HDR image to a predetermined dynamic range. Various methods such as a method considering the human visual characteristic or display device characteristic have been proposed for tone mapping. In this embodiment, an LDR image represented by an integer value (0 to 255) of 8 bits per component is assumed to be generated by tone mapping, and any method is usable. In step S403, the JPEG codec 305 encodes the LDR image created in step S402. In step S404, the JPEG codec 305 decodes the JPEG-encoded data of the LDR image created in step S403. In step S405, the HDR information generating unit 303 generates pseudo HDR information from the HDR image data input in step S401 and the LDR image data decoded in step S404. More specifically, inverse tone mapping is performed for the decoded LDR image using the tone curves used in step S402 to extend the dynamic range, thereby generating pseudo HDR image data (to be referred to as HDR decoded image data hereinafter). The difference between the HDR image data input in step S401 and the HDR decoded image data created by performing inverse tone mapping for the LDR image is calculated, and HDR information is generated together with the information of the tone curves used in tone mapping, and the like. In step S406, difference data in the HDR information generated in step S405 is converted into data of 8 [bits/component]. The JPEG codec 305 then encodes the difference data. In step S407, the meta-data generating unit 306 generates meta-data of the LDR image from LDR decoded image data. The generation method will be described later in detail with reference to the procedure shown in FIG. 5. In step S408, the CPU 301 generates an HDR file from the data generated in steps S403, S406, and S407 and outputs it. The HDR file output method will be described later in detail with reference to the procedure shown in FIG. 8.

<Explanation of Meta-Data Generation of LDR Image>

Figure 5:
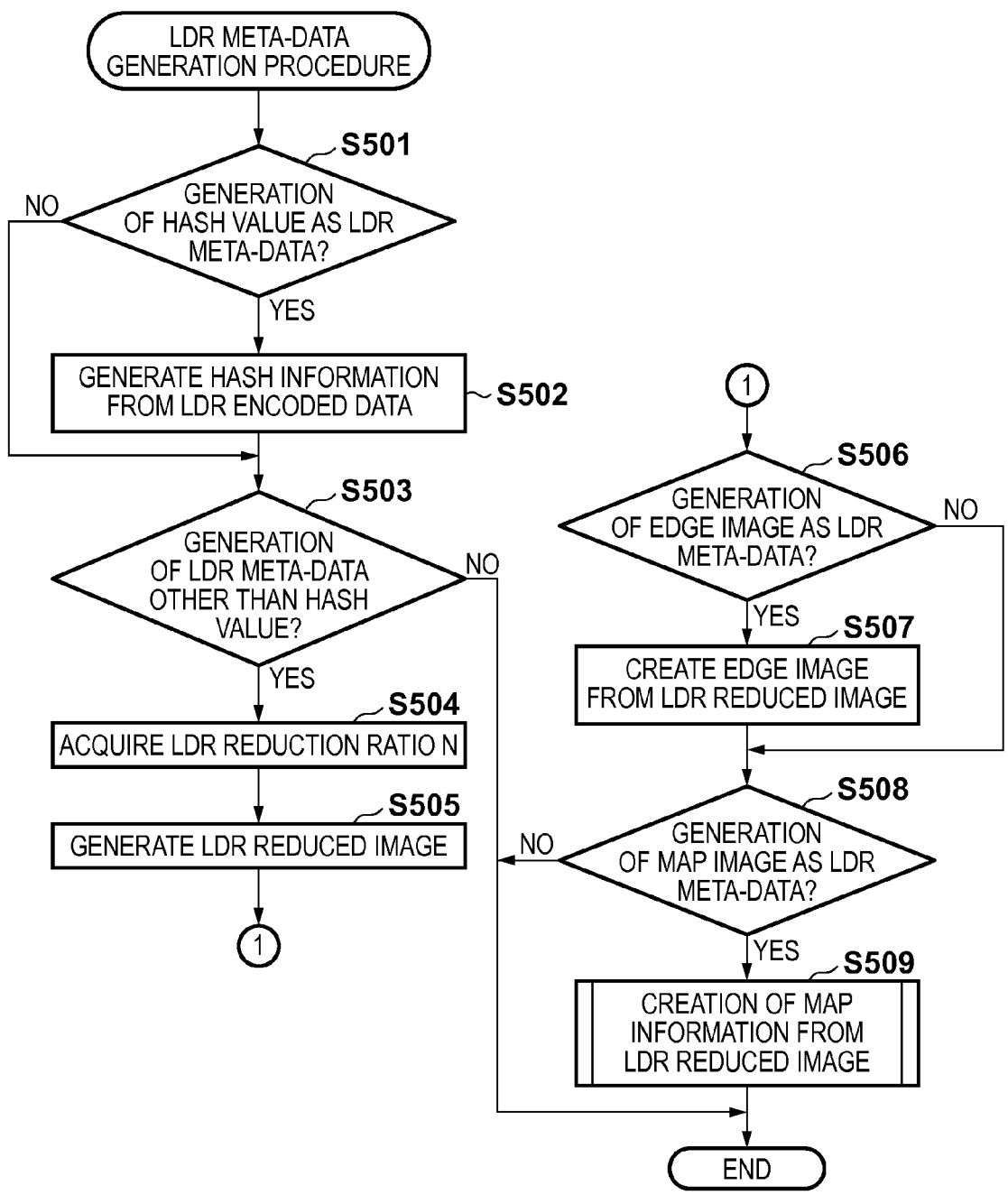
FIG. 5 is a flowchart of an LDR meta-data generation procedure.

LDR image meta-data generation processing of the meta-data generating unit 306 in step S407 will be described next with reference to the flowchart of FIG. 5. Note that a description will be made below assuming that in meta-data generation judgment processing of selecting whether to generate a hash value or the like, the user makes the selection using a UI (not shown) before encoding by the encoding apparatus 201.

In step S501, it is determined whether to generate a hash value as LDR meta-data. To generate a hash value, the process advances to step S502. Otherwise, the process advances to step S503. What should be generated as LDR meta-data can be predetermined by software based on the application purpose or decided in accordance with a user instruction. In this embodiment, assume that the user inputs an instruction to generate LDR meta-data of every type and store them. Hence, the process advances to step S502. In step S502, a hash value is calculated from the LDR encoded data created in step S403 using a predetermined hash function. The hash function is a function such as SHA-1, which is an operation function for generating a hash value as a pseudo random number having a fixed length based on input data. Various hash functions have been proposed, and a function of any type is usable. In this embodiment, SHA-1 is assumed to be used. When calculating a hash value, LDR encoded data before decoding is preferably used rather than LDR decoded image data generated in step S404. This is because LDR encoded data is generated by JPEG encoding that is lossy compression, and all pixel values of the decoding result do not necessarily match as the operation accuracy changes depending on the type of the CPU that performs decoding. In step S503, it is determined whether to generate LDR meta-data other than the hash value. To generate LDR meta-data, the process advances to step S504. Otherwise, this procedure ends. In this embodiment, the process advances to step S504.

In step S504, a reduction ratio N of the LDR image is acquired. The reduction ratio N can be a predetermined value or can be calculated from information designated by the user. In this embodiment, assume that the reduction ratio N is predetermined to N=8. In step S505, a reduced image (LDR reduced image) of the LDR decoded image is created from the reduction ratio N acquired in step S504 and the LDR decoded image obtained in step S404. More specifically, the LDR decoded image is divided into blocks each having N×N pixels. The average pixel value of each block is defined as the representative pixel of the block, thereby creating a reduced image. Note that in this embodiment, a square block of N×N pixels is formed. However, the reduction ratio may be set independently in the horizontal and vertical directions, and a representative pixel may be obtained from n×m pixels in the LDR image.

In this embodiment, an average value is obtained in each block of 8×8 pixels from 1,920×1,080 pixels. Hence, a reduced image (to be referred to as an LDR reduced image hereinafter) of 240×135 pixels is obtained. In step S506, it is determined whether to generate an edge image as LDR meta-data. To generate an edge image, the process advances to step S507. Otherwise, the process advances to step S508. In this embodiment, the process advances to step S507. In step S507, an edge image is created from the LDR reduced image created in step S505. More specifically, edge detection using a Sobel filter is performed for each of Y, Cb, and Cr components, and the edge intensity of each pixel is obtained. If the edge intensity is equal to or larger than a predetermined threshold (32 in this embodiment), a bit "1" is output as an edge pixel. If the edge intensity is smaller than the threshold, a bit "0" is output as a pixel other than an edge. In this embodiment, since the size of the reduced image is 240×135 pixels, an edge image of 4,050 [bytes] per component (=240×135=32,400 [bits]) is created. In step S508, it is determined whether to generate a map image as LDR meta-data. To generate a map image, the process advances to step S509. Otherwise, this procedure ends. In step S509, map information is created from the LDR reduced image created in step S505, and this procedure ends.

Figure 6:
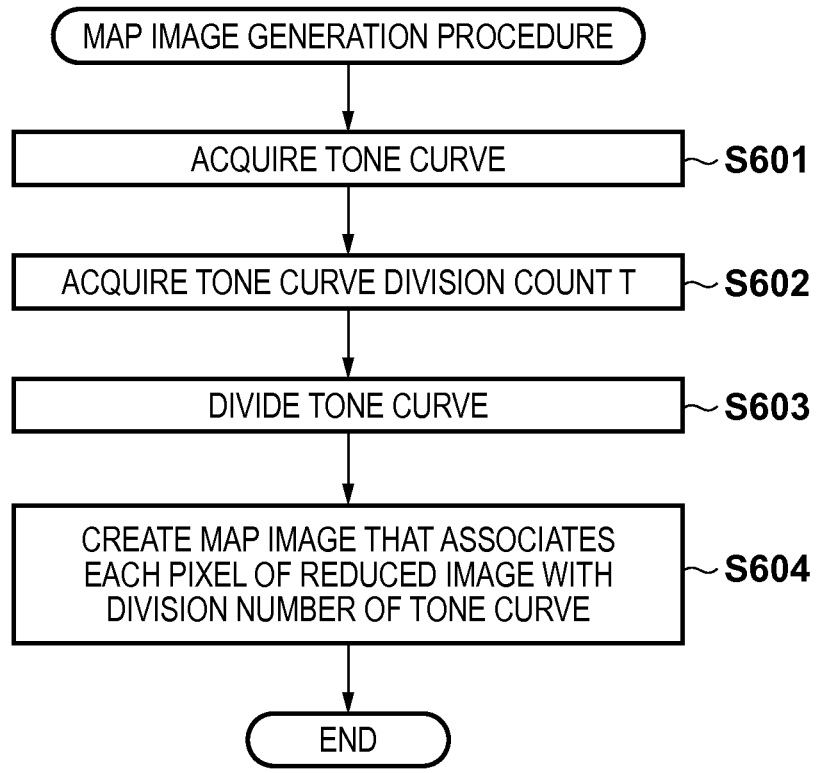
FIG. 6 is a flowchart of a map image generation procedure.
Figure 7A:
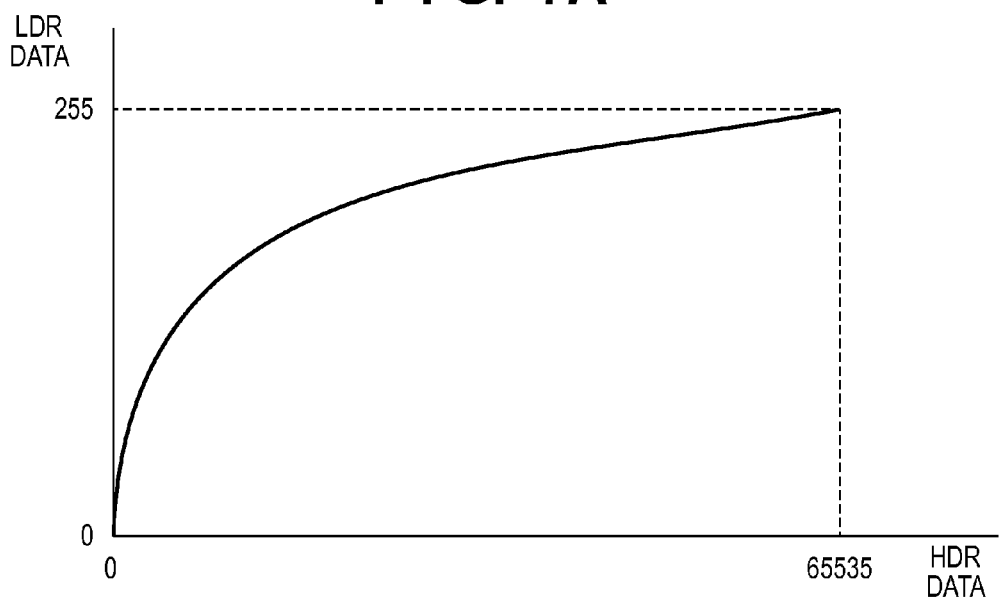
FIGS. 7A and 7B are graphs of a tone curve and division thereof.
Figure 7B:
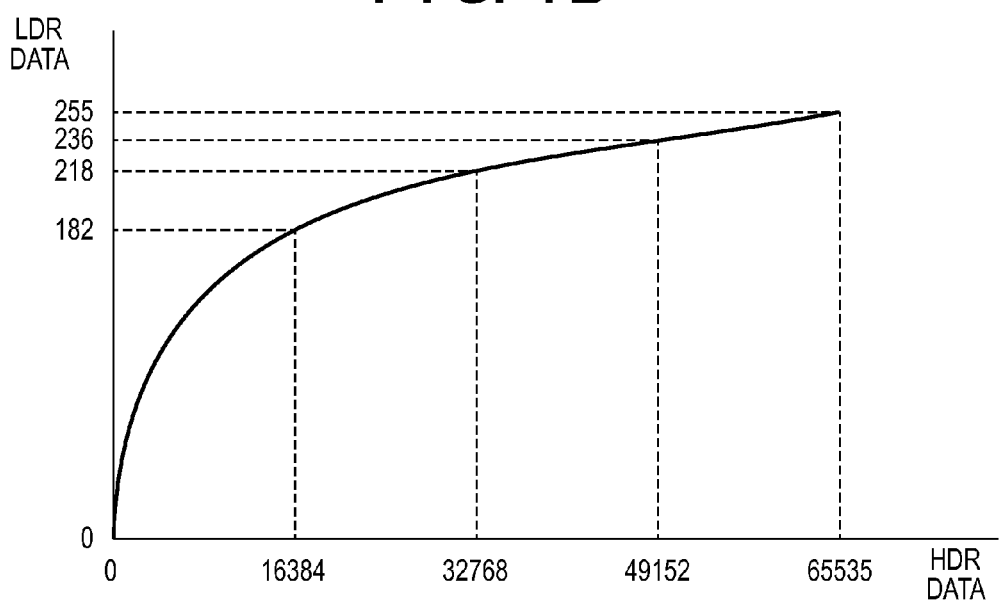

A method of creating map information from the LDR reduced image by the meta-data generating unit 306 in step S509 will be described next with reference to FIG. 6. In step S601, tone curves used in tone mapping of step S402 are acquired. In this embodiment, assume that a tone curve is set for each of the Y, Cb, and Cr components. In this embodiment, a tone curve as shown in FIG. 7A is assumed to be obtained for the Y component. Tone curves are similarly obtained for the Cb and Cr components as well. FIG. 7A shows only the tone curve of the Y component for the sake of descriptive simplicity. In step S602, a division count T of the tone curve is acquired. In this embodiment, the division count T is predetermined to 4. In step S603, the value of the HDR data of the tone curve is divided by T obtained in step S602, thereby dividing the tone curve. In FIG. 7A, HDR data within the range of 0 to 65535 (=$2^{16}$−1) is equally divided by T=4 so as to obtain four divided sections (ranges) of 0 to 16383, 16384 to 32767, 32768 to 49151, and 49152 to 65535. The range of the LDR data is also divided into four corresponding sections in correspondence with the divided sections. FIG. 7B shows the relationship between the boundary positions and the values of the LDR data when the HDR data is equally divided into four parts. As is apparent from FIGS. 7A and 7B, the tone curve is divided in the following way:

division number 0 (HDR range: 0 to 16383, LDR range: 0 to 181);
division number 1 (HDR range: 16384 to 32767, LDR range: 182 to 217);
division number 2 (HDR range: 32768 to 49151, LDR range: 218 to 235); and
division number 3 (HDR range 49152 to 65535, LDR range: 236 to 255).

In step S604, the pixels of the LDR image created in step S505 are mapped to the division numbers of the tone curve divided in step S603, thereby creating a map image. Since the division numbers are 0 to 3, each pixel can be expressed by 2 bits. In this embodiment, when the Y component value of a pixel of interest of the LDR image falls within the range of 0 to 181, the map information of Y of the pixel is represented by 2 bits "00". Similarly, when the Y component value falls within the range of 182 to 217, the map information is represented by 2 bits "01". When the Y component value falls within the range of 218 to 235, the map information is represented by 2 bits "10". When the Y component value falls within the range of 236 to 255, the map information is represented by 2 bits "11". The same association is done for the Cb and Cr components, thereby creating a map image in which each pixel has information of a total of 6 bits of three division numbers. This procedure thus ends.

In this embodiment, since the size of the reduced image is 240×135 pixels, a map image of 24,300 [bytes] (=240×135× 6=194,400 [bits]) is created. In this embodiment, since the number of bits capable of representing division count T=4 states is 2, map information is represented by 00 to 11. However, the number of bits changes depending the value of the division count T, as a matter of course. More specifically, when division count T=2, one bit suffices. When division count T=5 to 8, 3 bits are necessary.

Figure 8:
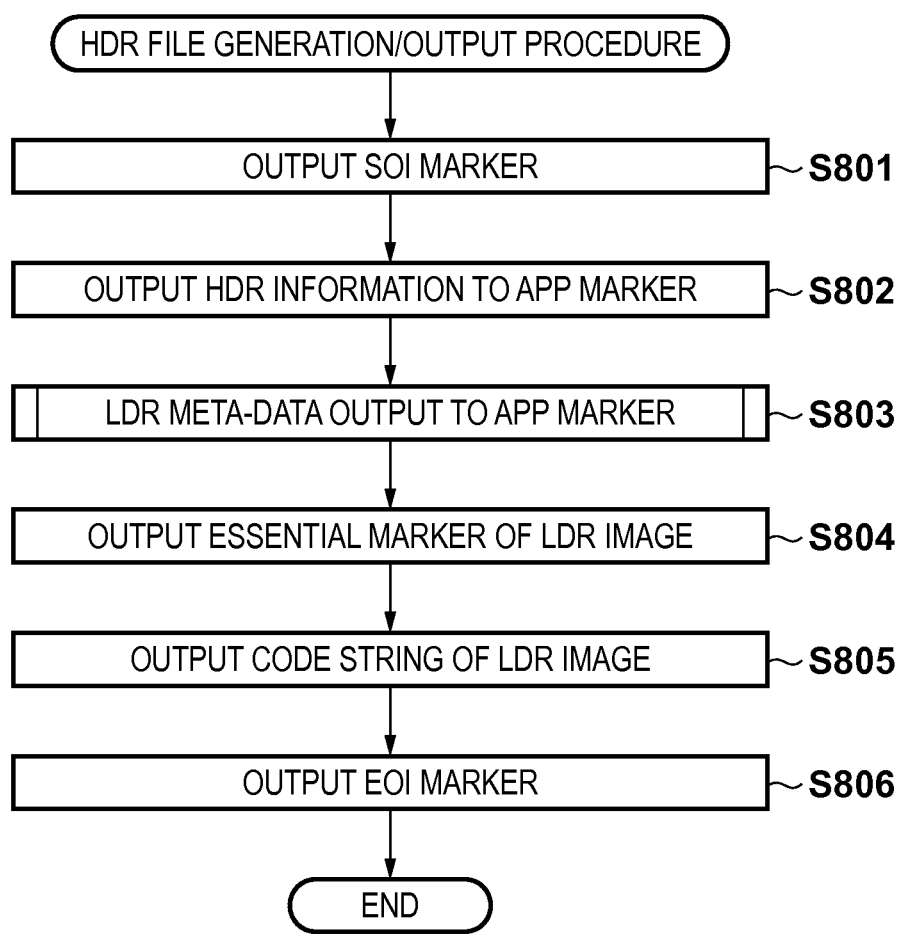
FIG. 8 is a flowchart of an HDR file generation/output procedure.

HDR file generation processing by the CPU 301 in step S408 according to this embodiment will be described with reference to FIG. 8. In step S801, the SOI (Start Of Image) marker of an HDR file is output. In step S802, encoded HDR information is output into an APP marker. In this embodiment, HDR information is output to APP11, as shown in FIG. 1B. In step S803, LDR meta-data is output into the APP marker to which the HDR information is output in step S802. The LDR meta-data output method will be described later with reference to FIGS. 9A and 9B. In step S804, the JPEG essential markers of the JPEG-compressed LDR image are output. The JPEG essential markers are markers storing information necessary for JPEG decoding, for example, a DQT marker strong information of a quantization table, an SOF marker storing information concerning color information, and a DHT marker storing Huffman table definitions. These are known techniques, and a detailed description thereof will be omitted here. In step S805, the JPEG code string of the LDR image created in step S403 is stored in the main encoded data storage region of the file structure of JPEG encoding and output. In step S806, an EOI (End Of Image) marker representing the end of the HDR file is output, and this procedure ends.

Figure 9A:
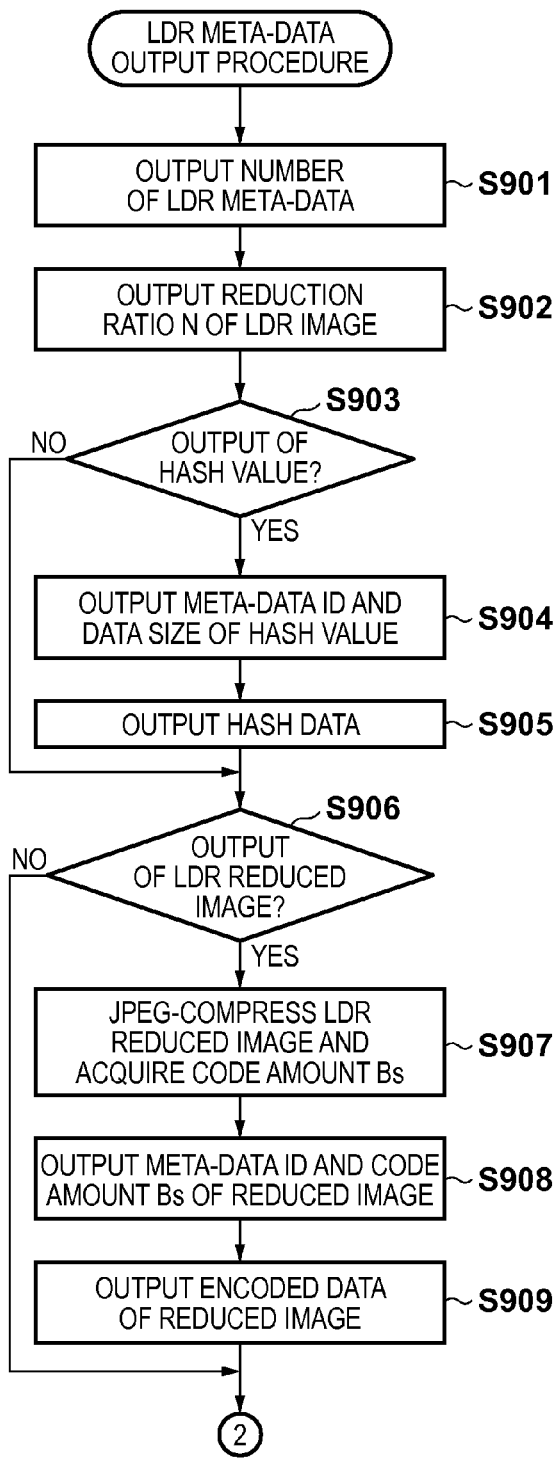
FIGS. 9A and 9B are flowcharts of an LDR meta-data output procedure.
Figure 9B:
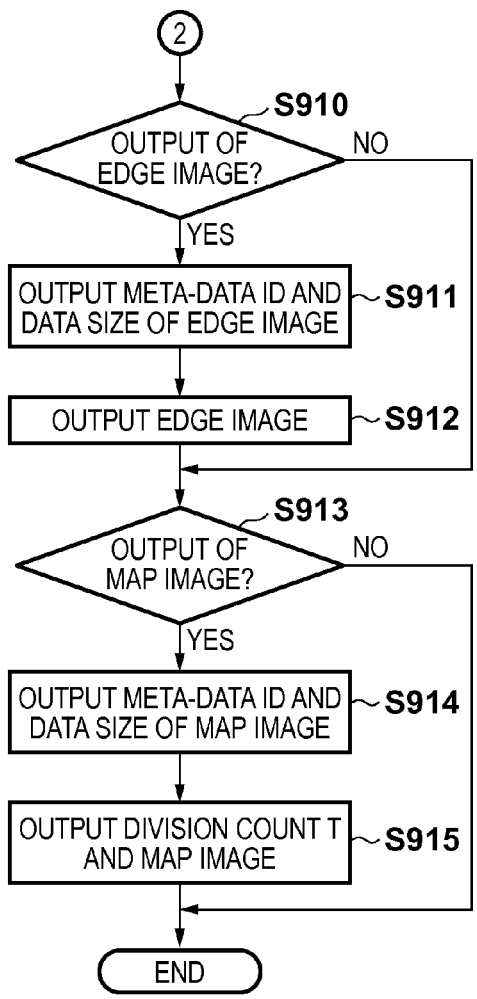

An LDR meta-data output method by the CPU 301 will be described next with reference to FIGS. 9A and 9B. In step S901, the number of LDR meta-data to be output is output next to the HDR information output in step S802. In this embodiment, a value "4" is output. In step S902, the reduction ratio "N" of the LDR image acquired in step S504 is output in 1 byte. In this embodiment, since reduction ratio N=8, 0x08 (HEX) is output. If no LDR meta-data other than the hash value is generated in the procedure of FIG. 5, N=0 is output as the LDR reduction ratio. In step S903, it is determined whether a hash value is output as LDR meta-data. If a hash value is output, the process advances to step S904. Otherwise, the process advances to step S906. In this embodiment, since a hash value is output, the process advances to step S904. In step S904, the meta-data ID and the data size of the hash value are output. In this embodiment, assume that IDs shown in FIG. 10C are assigned to the respective meta-data types. Hence, 0x00 (HEX) is output as the ID. In addition, the data size of the hash information generated in step S502 is output as the data size. In step S905, the hash information generated in step S502 is output. In step S906, it is determined whether an LDR reduced image is output as LDR meta-data. If an LDR reduced image is output, the process advances to step S907. Otherwise, the process advances to step S910. In this embodiment, since an LDR reduced image is output, the process advances to step S907. In step S907, the LDR reduced image created in step S505 is JPEG-compressed, and a code amount Bs is acquired. In step S908, the meta-data ID (0x01 in this embodiment) of the LDR reduced image and the code amount Bs acquired in step S907 are output. In step S909, the JPEG data of the LDR reduced image created in step S907 is output.

In step S910, it is determined whether an edge image is output as LDR meta-data. If an edge image is output, the process advances to step S911. Otherwise, the process advances to step S913. In this embodiment, since an edge image is output, the process advances to step S911. In step S911, the meta-data ID (0x02 in this embodiment) of the edge image and the value of the data size byte of the edge image created in step S505 are output. In this embodiment, 12,150 [bytes] (=4,050 [byte/component]×3 [components]) is output as the number of bytes of the edge image. In step S912, the edge image created in step S505 is output. In step S913, it is determined whether a map image is output as LDR meta-data. If a map image is output, the process advances to step S914. Otherwise, this procedure ends. In this embodiment, since a map image is output, the process advances to step S914. In step S914, the meta-data ID (0x03 in this embodiment) of the map image and a value (number of bytes of map image created in step S604+1 byte) is output. In this embodiment, since the number of bytes of the map image is 24,300 [bytes], a value "24,301" is output. In step S915, the tone curve division count T is output in 1 byte. Subsequently, the map image created in step S604 is output, and this procedure ends. In this embodiment, after 0x04 (HEX) is output as the tone curve division count T, the map image of 24,300 [bytes] is output.

FIG. 10A shows the output format of LDR meta-data output in this embodiment. FIG. 10B shows the contents of the structure shown in FIG. 10A. A parameter ID representing that LDR meta-data is stored is formed from 4 bytes and is assumed to be represented by a character string "Idmd" or 0x6C64 or 6D64 in hexadecimal notation. One set of three parameters Mid, Msize, and Mcontents shown in FIG. 10A is output in correspondence with one LDR meta-data. Hence, a set as many as the number described in a parameter MN follows MN.

FIG. 1B shows the structure of an HDR file output in this embodiment. LDR meta-data is stored in one APP marker (APP11 in this embodiment) of a JPEG file so as to append to HDR information. Hence, the HDR information and the LDR meta-data created from the LDR image at the time of HDR information creation circulate together as HDR extension data, and it is easy to detect that only the LDR image has been edited. A thumbnail image like the reduced image of LDR meta-data is stored in APP11 as EXIF information (see FIG. 1E). When editing the LDR image, the editing apparatus 202 capable of recognizing EXIF data (APP11 marker) may change the thumbnail image of EXIF data in accordance with the edited LDR image. However, if the editing apparatus cannot recognize HDR information, the reduced image as the LDR meta-data in the HDR information is not rewritten. Hence, it is very effective to store the information of the LDR image at the time of HDR information creation together with the HDR information as HDR extension data.

When an image generated by reducing the decoded image of LDR encoded data is held as LDR meta-data, mismatch between the LDR image and the HDR information can be detected while allowing mismatch to some extent. That is, since the average value of N×N pixels is used, shading, noise removal, sharpness, dust removal, or the like by a filter radius equal to or smaller than the reduction ratio N does not affect the reduced image. In addition, a small variation in pixel value caused by, for example, changing the compression parameter does not largely affect the reduced image. However, processing that changes colors such as y correction for the entire image affects the reduced image as well. Hence, the LDR reduced image changes before and after the processing.

Since an edge image is created as LDR meta-data using the LDR reduced image formed from the average value of N×N pixels, there is no influence of noise or the like. For this reason, the edge image can easily be obtained using even a very simple edge detection filter such as a Sobel filter. In addition, when the edge intensity is binarized using a threshold, the information amount of the LDR meta-data can be decreased. Since only edge information is stored, the edge image is not affected by processing that does not change the shape of an object, such as y correction for the entire image. Processing that rarely affects the LDR reduced image does not affect the edge image, either, as a matter of course.

Since a map image is created as LDR meta-data by applying pixel value ranges obtained by dividing a tone curve by T to the pixels of the reduced image, meta-data of more coarse information can be created. Image processing such as distortion correction can be performed without any influence as long as the pixel value level does not fall outside the pixel value range of the tone curve. Image processing that affects the map image includes insertion/deletion of an object larger than the N×N [pixel] region and processing for changing the hue of the image, represented by monochrome conversion, sepia conversion. Note that processing that does not affect the LDR reduced image or edge image does not affect the map image, either, as a matter of course.

A plurality of types of meta-data whose influences vary depending on the type of editing can easily be created from one LDR reduced image by using the method of this embodiment. Note that the edge image and the map image are preferably encoded by lossless compression encoding.

In the above embodiment, a method of storing both HDR information and LDR meta-data in one APP marker has been described. The APP marker is allowed to have a data length expressed by only 2 bytes because of its specification. Hence, if the image size is large, or the reduction ratio N to create LDR meta-data is small, it is probably impossible to store both HDR information and LDR meta-data in one APP marker. In this case, LDR meta-data may divisionally be stored in a plurality of regions having the same APP marker as that of HDR information.

FIG. 1C shows the structure of an HDR file that stores information in this way. FIG. 1C shows an example in which both HDR information and LDR meta-data are stored in APP11 marker. In this case, the HDR information and the LDR meta-data use the same APP marker, and data shown in FIG. 10A is stored next to 0xFFEB representing APP11 and the APP marker having a data length of 2 bytes. Hence, when the character string "Idmd" is stored after the APP11 marker having a data length of 2 bytes, it can be determined that not HDR information but LDR meta-data is stored.

LDR meta-data information may be divided into a plurality of parts in accordance with the types of meta-data. For example, the four pieces of LDR meta-data information of this embodiment may be stored in four APP markers each having parameter MN=1.

LDR meta-data information may be divided not at a semantic break but at some midpoint. For example, since an APP marker can store data of 65,536 [bytes] at maximum, LDR meta-data may mechanically be divided at a unit where the total amount of HDR information and LDR meta-data becomes 65,536 [bytes]. FIG. 1D shows the structure of an HDR file that stores information in this way. In this case, when data in the same APP marker are read out such that they are continuous from the start of the file, the same data as in FIG. 1B can be obtained.

As described above, when the storage location of LDR meta-data information is divided, it can be stored together with the HDR information even if the data size of each LDR meta-data is large.

When LDR meta-data is stored in the same APP marker as that of HDR information, a device incapable of recognizing HDR information can handle the LDR meta-data like HDR information, and both data circulate together at a high possibility.

Processing of detecting mismatch between HDR information and LDR information included in a received file by the HDR image decoding apparatus 203 shown in FIG. 2 will be described next. That is, the decoding apparatus 203 according to this embodiment functions as an HDR image file verification apparatus. In this embodiment, the decoding apparatus 203 is assumed to receive the HDR file 205 created by the above-described encoding apparatus. The HDR file 205 is assumed to include all of a hash value, a reduced image, an edge image, and a map image as LDR meta-data.

FIG. 11 is a block diagram of the HDR image decoding apparatus 203 according to this embodiment. The same reference numerals as in the HDR image encoding apparatus 201 shown in FIG. 3 denote same parts in FIG. 11, and a description thereof will be omitted here. The input unit 302 is a portion that inputs an instruction from the user or a JPEG file including an HDR encoded file. The meta-data generating unit 306 generates meta-data of an LDR image from LDR encoded data extracted from the file. An HDR image generating unit 1101 analyzes an HDR file input from the input unit 302, and generates (extracts) an HDR image from an LDR image and HDR information. A mismatch detection unit 1102 analyzes an HDR file input from the input unit 302, compares LDR image meta-data in the HDR file and the meta-data of the LDR image generated by the meta-data generating unit 306, and detects mismatch between the HDR information and the LDR image. The mismatch detection method will be described later with reference to FIG. 12. The display unit 307 normally uses a liquid crystal display or the like. The memory 308 includes a ROM and a RAM, and provides programs, data, work area, and the like necessary for processing to the CPU 301. Reference numeral 309 denotes the communication I/F unit; and 310, the storage unit that is a portion configured to store image data, programs, and the like and normally uses a hard disk or the like. Control programs necessary for the processes of flowcharts to be described below are assumed to be stored in the storage unit 310 or the ROM of the memory 308. A program stored in the storage unit 310 is temporarily loaded to the RAM of the memory 308 and executed. Note that although the system arrangement further includes various constituent elements other than those described above, they are not the gist of the present invention, and a description thereof will be omitted.

Figure 12:
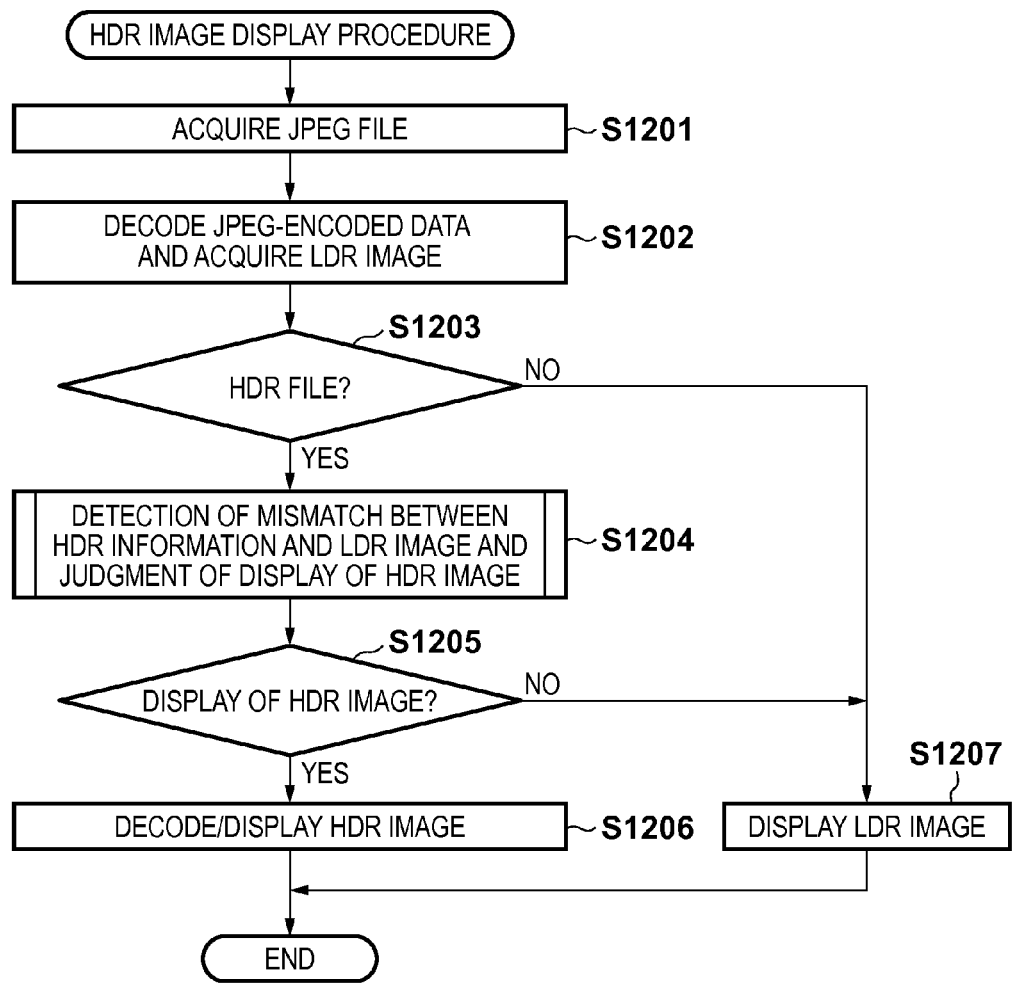
FIG. 12 is a flowchart of an HDR image display procedure.

FIG. 12 is a flowchart showing a procedure of HDR file decoding and HDR image display executed by the CPU 301 of the decoding apparatus 203. Processing of displaying an HDR image according to this embodiment will be described below with reference to FIG. 12.

In step S1201, the CPU 301 acquires a display target JPEG file. In this embodiment, assume that the HDR file 205 sent from the LDR image editing apparatus 202 is acquired as a display target JPEG file. In step S1202, the JPEG-encoded data of the JPEG file acquired in step S1201 is decoded, and an LDR image is acquired. In this embodiment, the decoded image of the LDR image 209 in the HDR file 205 is obtained. In step S1203, it is determined whether the JPEG file acquired in step S1201 is an HDR file. More specifically, the JPEG file is analyzed, and if an APP marker storing HDR information exists, the file is determined as an HDR file, and the process advances to step S1204. Otherwise, the file is determined not to be an HDR file, and the process advances to step S1207. In this embodiment, since an APP11 marker exists, the file is determined as an HDR file. In step S1204, the mismatch detection unit 1102 executes processing of detecting mismatch between the HDR information and the LDR image, and HDR image display judgment is performed in accordance with the result of detection processing. This processing will be described later with reference to FIG. 13. In step S1205, it is decided based on the judgment obtained in step S1204 whether to display the HDR image (display control or output control). To display the HDR image, the process advances to step S1206. Not to display the HDR image, the process advances to step S1207. In step S1206, inverse tone mapping is performed for the LDR image acquired in step S1202, and the HDR image is decoded using the HDR information and the image obtained by inverse tone mapping. The decoded HDR image is then displayed. In step S1207, the LDR image obtained in step S1202 is directly displayed.

The procedure of HDR image display judgment processing executed by the CPU 301 will be described next with reference to the procedure shown in FIG. 13. The same step numbers as in FIG. 5 denote steps to perform the same operations in FIG. 13.

In step S1301, difference information is acquired from HDR information. In step S1302, the vertical and horizontal sizes (number of pixels) of the HDR information are acquired from the difference information acquired in step S1301. Since the difference information is JPEG-compressed, the vertical and horizontal sizes of the HDR information can be acquired by referring to a value in the frame header of the JPEG data. In this embodiment, the number of horizontal pixels is 1,920, and the number of vertical pixels is 1,080. In step S1303, the vertical and horizontal sizes of the LDR image are acquired. In this embodiment, since the LDR image is JPEG-compressed as well, the vertical and horizontal sizes can be acquired by similarly referring to a value in the frame header. In this embodiment, assume that the number of horizontal pixels is 1,920, and the number of vertical pixels is 1,080. In step S1304, it is judged whether the horizontal and vertical sizes acquired in steps S1302 and S1303 match. If the horizontal and vertical sizes do not match, it can be determined that the image size has been changed by editing only the LDR image during circulation of the HDR file. If the horizontal and vertical sizes match, the process advances to step S1305. If the horizontal and vertical sizes do not match, the process advances to step S1314. In this embodiment, since the horizontal and vertical sizes match, the process advances to step S1305.

In step S1305, it is judged whether LDR meta-data exists in the HDR file. If LDR meta-data exists, the process advances to step S1306 to detect mismatch between the LDR image and the HDR information. If LDR meta-data does not exist, mismatch detection cannot be performed. Hence, the process advances to step S1309 to decide to display the HDR image, and this procedure ends. In this case, however, there is no guarantee that the image quality will not degrade when the HDR image is displayed.

In this embodiment, this can be determined based on whether the data shown in FIG. 10A starting with the identifier "Idmd" exists after the HDR information. Assuming that LDR meta-data exists, the process advances to step S1306. In step S1306, it is determined whether the LDR meta-data includes a hash value. More specifically, the LDR meta-data is interpreted in accordance with the structure shown in FIG. 10A. When parameter Mid=0x00 representing the parameter ID exists, it can be determined that a hash value exists. If a hash value exists, the process advances to step S1307. If no hash value exists, the process advances to step S1310. In step S1307, the hash value is acquired from the LDR meta-data. More specifically, 2-byte data Msize following Mid=0x00 read in step S1306 is read out. Mcontents as much as the number of bytes described in Msize is read out, thereby acquiring the hash value of the LDR meta-data. In step S502, a hash value is calculated from the LDR encoded data 209 in the HDR file, as in FIG. 5. The hash value calculation method is the same as that on the encoding apparatus side, and a description thereof will be omitted here. In step S1308, the hash value acquired in step S1307 is compared with that calculated in step S502. If the hash values match, it can be confirmed that the LDR encoded data remains the same as that at the time of HDR information creation. That is, since it can be judged that the LDR image has not undergone editing, the process advances to step S1309. If the hash values do not match, it is determined that the LDR image has undergone editing, the process advances to step S1310 and the subsequent steps to detect mismatch. In step S1309, it is decided to display the HDR image, and this procedure ends.

In this embodiment, assume that the hash values do not match in step S1308, and the process advances to step S1310. In step S1310, the level of mismatch between the LDR image and the HDR information is detected. The mismatch level detection method will be described later in detail with reference to FIG. 14. In this embodiment, the mismatch levels are represented by numerical values 1 to 4. The larger the numerical value is, the higher the degree of mismatch is. If the mismatch level cannot be judged, the mismatch level is represented by −1. In step S1311, it is determined based on the result of step S1310 whether the mismatch is large. In this embodiment, this is determined based on whether the mismatch level is represented by the maximum value 4. If the mismatch level is 4, the mismatch level is determined as high, and the process advances to step S1314. In step S1314, it is determined that the mismatch between the LDR image and the HDR information is large, and holding the HDR information is of no worth, and the HDR information and the LDR meta-data are deleted from the HDR file. After that, the process advances to step S1315 to decide to display the LDR image, and this procedure ends.

If the mismatch level acquired in step S1310 is lower than 4, it is determined that the mismatch is not large, and the process advances to step S1312. In step S1312, an allowable level of mismatch is acquired. In this embodiment, assume that the user is notified of the existence of mismatch between the LDR image and the HDR information (for example, "there is mismatch" is displayed on the display screen), the allowable level of mismatch is decided by a user instruction, and the value is acquired. In step S1313, the allowable level acquired in step S1312 is compared with the mismatch level acquired in step S1310. If the mismatch level is equal to or lower than the allowable level, it is determined that the detected degree of mismatch has no adverse influence on HDR image display, and the process advances to step S1309. In step S1309, it is decided to display the HDR image, and this procedure ends. If the mismatch level is higher than the allowable level in step S1313, it is determined that displaying the HDR image by combining the LDR image and HDR information is not appropriate, and the process advances to step S1315. In step S1315, it is decided to display the LDR image, and this procedure ends.

Figure 14:
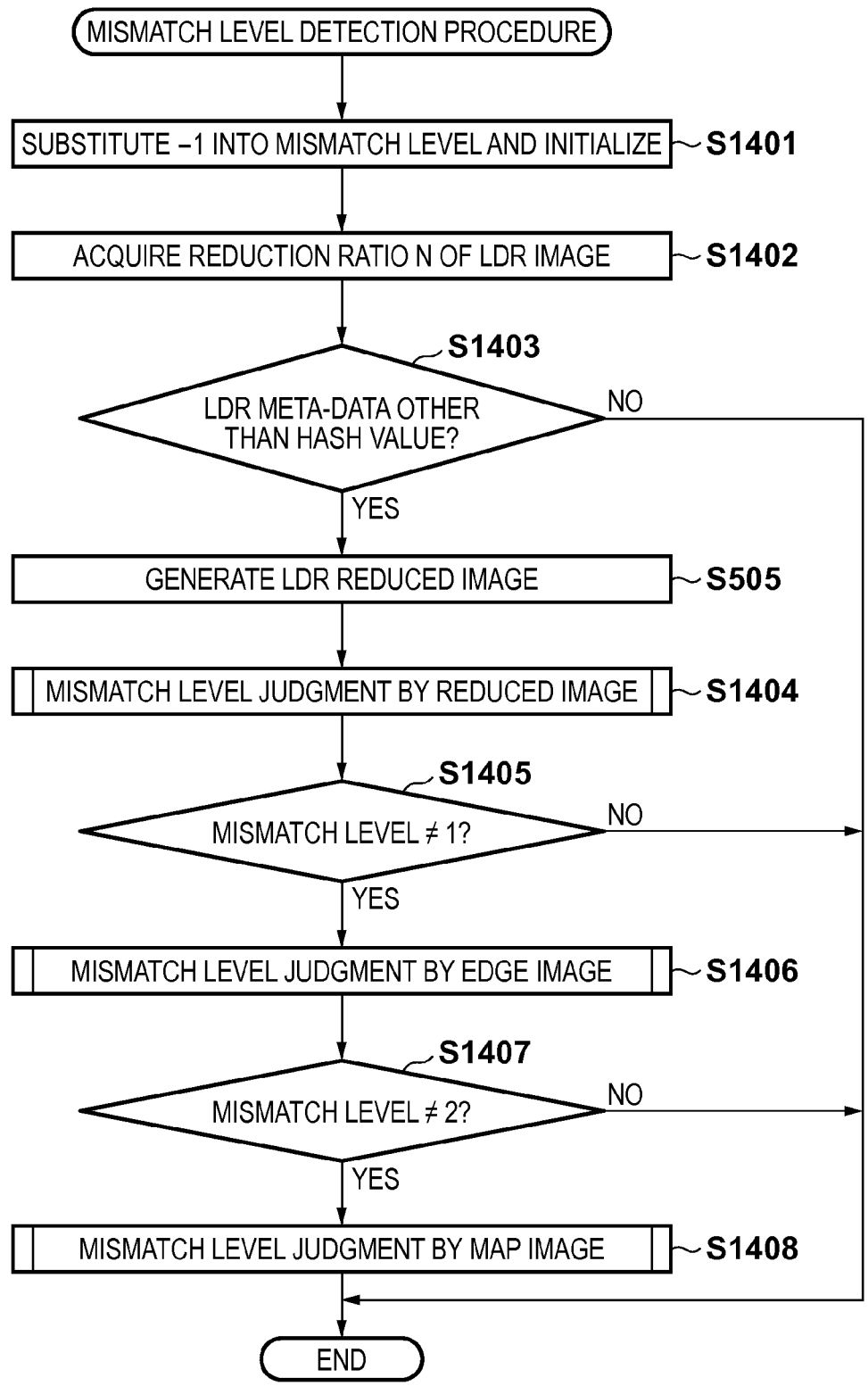
FIG. 14 is a flowchart of a mismatch level detection procedure.

The mismatch level detection processing of step S1310 executed by the CPU 301 will be described next with reference to the procedure shown in FIG. 14. In step S1401, the mismatch level is initialized by substituting −1 into it. In step S1402, the reduction ratio N of the LDR image is acquired. The reduction ratio N can be acquired by interpreting LDR meta-data in accordance with the structure shown in FIG. 10A and reading the value of a parameter Mr. In step S1403, it is detected whether LDR meta-data other than the hash value is included in the HDR file. If the reduction ratio N acquired in step S1402 is a value other than 0, it can be determined that LDR meta-data other than the hash value exists. If the reduction ratio N is 0, it can be determined that only the hash value is stored as LDR meta-data. If LDR meta-data other than the hash value exists, the process advances to step S505. If LDR meta-data other than the hash value does not exist, the mismatch level cannot be detected. Hence, it is determined that the mismatch level cannot be judged, and this procedure ends while the mismatch level remains at the initial value −1. In step S505, an image (LDR reduced image) is created by reducing the LDR image decoded in step S1202 by the reduction ratio N acquired in step S1402. The LDR reduced image creation method is the same as that on the encoding apparatus side, and a description thereof will be omitted here. In step S1404, mismatch level judgment by the reduced image created in step S505 is performed. This judgment method will be described later with reference to FIG. 15. In step S1405, it is determined whether the mismatch level judged in step S1404 is 1. Mismatch level=1 indicates that the reduced images match. If the mismatch level is 1, it is determined that the mismatch level is decided, and this procedure ends. If the mismatch level is not 1, the reduced images do not match, and the mismatch level is not decided. Hence, the process advances to step S1406. In step S1406, mismatch level judgment by an edge image is performed. This judgment method will be described later with reference to FIG. 16. In step S1407, it is determined whether the mismatch level judged in step S1406 is 2. Mismatch level=2 indicates that the edge images match. It is determined that the mismatch level is decided, and this procedure ends. If the mismatch level is not 2, the edge images do not match, and the mismatch level is not decided. Hence, the process advances to step S1408. In step S1408, mismatch level judgment by a map image is performed, and this procedure ends. The judgment method of step S1408 will be described later with reference to FIG. 17.

Figure 15:
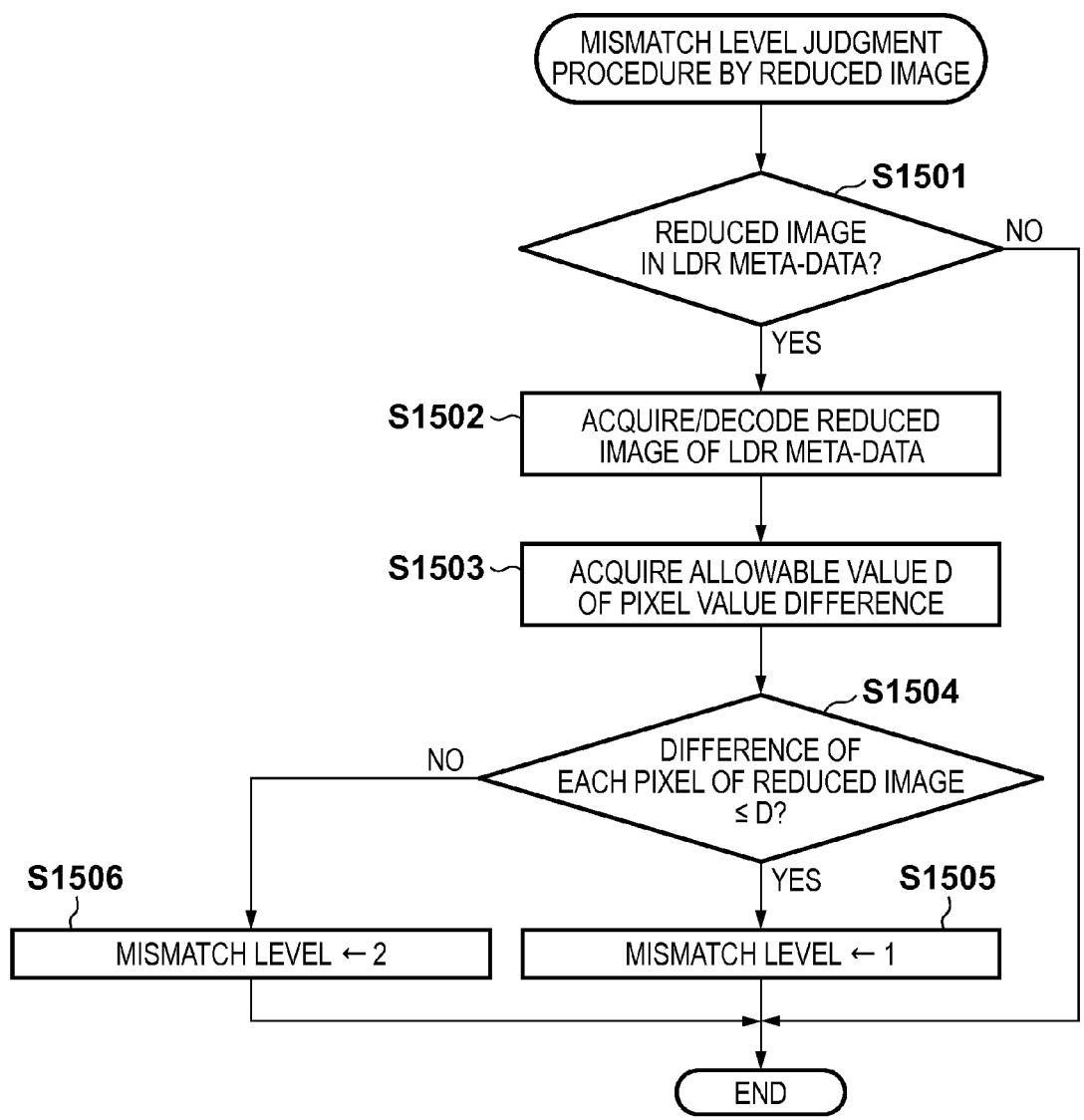
FIG. 15 is a flowchart of a mismatch level judgment procedure by a reduced image.

The mismatch level judgment processing (step S1404) executed by the CPU 301 will be described next with reference to the procedure shown in FIG. 15. In step S1501, it is checked whether LDR meta-data includes a reduced image.

To do this, LDR meta-data is interpreted in accordance with the structure shown in FIG. 10A. If there is the parameter Mid representing a meta-data ID 0x01, it can be determined that a reduced image exists. If a reduced image exists, the process advances to step S1502. If no reduced image exists, mismatch level judgment by a reduced image cannot be performed. Hence, this procedure ends while maintaining mismatch level=−1. In step S1502, a JPEG-compressed reduced image is acquired from the LDR meta-data and decoded. In step S1503, an allowable value D of the pixel value difference is acquired. This is because both the reduced image included in the LDR meta-data and the LDR image in the HDR file are created by decoding an encoding result by JPEG compression that is lossy compression. For this reason, even when only the LDR image is recompressed without performing any processing for the image itself, the pixel values change before and after recompression. Hence, since even reduced images do not always completely match, an allowable value is set for the pixel value difference. In this embodiment, the allowable value D is assumed to be predetermined to "6". In step S1504, differences between the pixels of the reduced image of the LDR meta-data decoded in step S1502 and those of the LDR reduced image created in step S505 of FIG. 14 are obtained for each color component. If all difference values fall within the allowable range represented by the threshold D acquired in step S1503, it is determined that the two reduced images match, and the process advances to step S1505. If at least one of the difference values exceeds the threshold D, it is determined that the two reduced images do not match, and the process advances to step S1506. In step S1505, a value 1 representing that the reduced images match although the hash values do not match is substituted into the mismatch level, and this procedure ends. In step S1506, since the reduced images do not match, the mismatch level is determined to be at least 2. Hence, 2 is substituted into the mismatch level, and this procedure ends.

Figure 16:
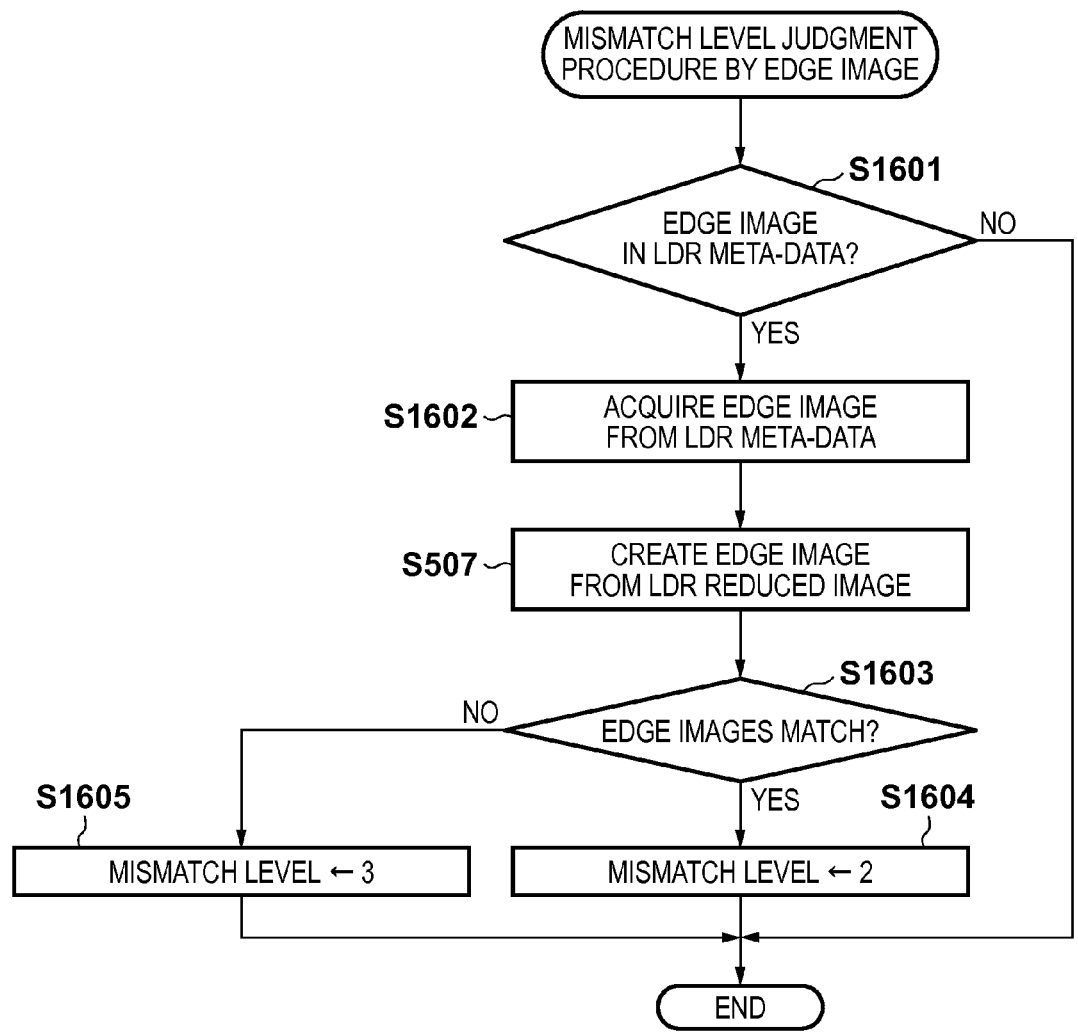
FIG. 16 is a flowchart of a mismatch level judgment procedure by an edge image.

The mismatch level judgment processing (step S1406) executed by the CPU 301 will be described next with reference to the procedure shown in FIG. 16. In step S1601, it is checked whether LDR meta-data includes an edge image. To do this, LDR meta-data is interpreted in accordance with the structure shown in FIG. 10A. If there is the parameter Mid representing a meta-data ID 0x02, it can be determined that an edge image exists. If an edge image exists, the process advances to step S1602. If no edge image exists, mismatch judgment by an edge image cannot be performed. Hence, this procedure ends without changing the mismatch value. In step S1602, an edge image is acquired from the LDR meta-data. To acquire an edge image from the LDR meta-data, the value of the 2-byte parameter Msize following the parameter Mid is read out. After that, data following the parameter Msize is read out in an amount as much as the number of bytes represented by the readout value of Msize, thereby obtaining an edge image. In this embodiment, assuming that Msize=12, 150, and 12,150-byte data following the parameter Msize is acquired as an edge image. In step S507, an edge image is created from the LDR reduced image created in step S505 of FIG. 14. The edge image creation method is the same as the already described processing, and a description thereof will be omitted here. In step S1603, the edge image acquired in step S1602 is compared with the edge image created in step S507. If the edge images match, the process advances to step S1604. If the edge images do not match, the process advances to step S1605. In this embodiment, the 12,150-byte data of the two edge images are compared on a byte basis, and if all bytes match, the process advances to step S1604. If at least one of the bytes does not match the counterpart, the process advances to step S1605. In step S1604, a value 2 representing that the edge images match although the hash values or reduced images do not match is substituted into the mismatch level, and this procedure ends. In step S1605, since the edge images do not match, the mismatch level is determined to be at least 3. Hence, 3 is substituted into the mismatch level, and this procedure ends.

Figure 17:
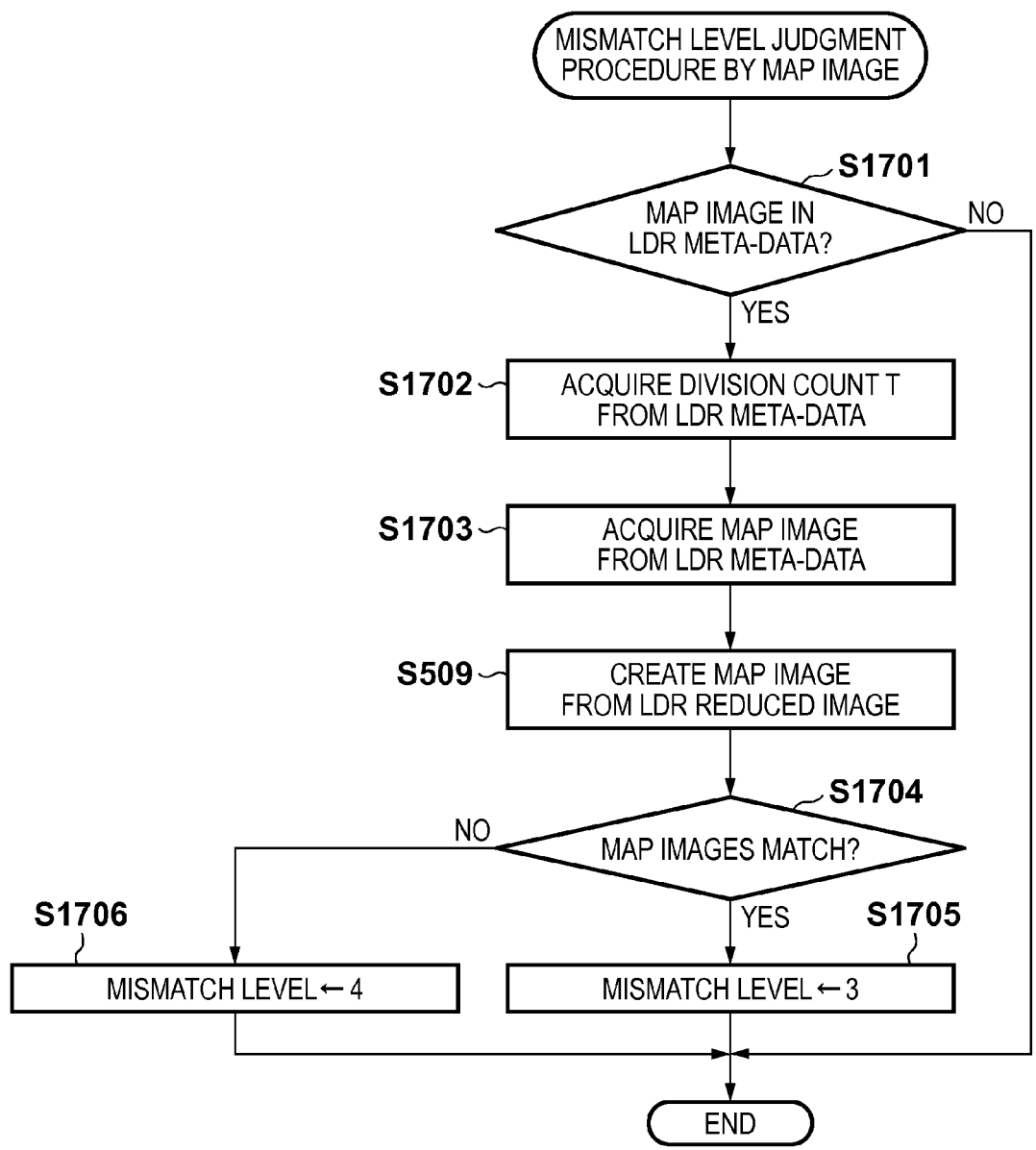
FIG. 17 is a flowchart of a mismatch level judgment procedure by a map image.

The mismatch level judgment processing (step S1408) executed by the CPU 301 will be described next with reference to the procedure shown in FIG. 17. In step S1701, it is checked whether LDR meta-data includes a map image. To do this, LDR meta-data is interpreted in accordance with the structure shown in FIG. 10A. If there is the parameter Mid representing a meta-data ID 0x03, it can be determined that a map image exists. If a map image exists, the process advances to step S1702. If no map image exists, mismatch judgment by a map image cannot be performed. Hence, this procedure ends without changing the mismatch value. In step S1702, a map image is acquired from the LDR meta-data. The tone curve division count T is acquired from the LDR meta-data. The division count T is stored in the first one byte of Mcontents. Hence, the value of the 2-byte parameter Msize following the parameter Mid is read out, and 1-byte data following Msize is read out, thereby obtaining the division count T. In this embodiment, assume that the number of bytes readable from Msize is 24,301. Hence, the first one byte of Mcontents represents the division count T, and the following 24,300 [bytes] correspond to the map image. In step S1703, the map image is acquired from the LDR meta-data. In step S503, a map image is created from the LDR reduced image created in step S505 of FIG. 14 and the tone curve division count T acquired in step S1702. The map image creation method is the same as that of the encoding apparatus 201, and a description thereof will be omitted here. In step S1704, the map image created in step S509 immediately before is compared with the map image acquired in step S1703. If the map images match, the process advances to step S1705. Otherwise, the process advances to step S1706. The map images are compared on a byte basis, like comparison of edge images. In step S1705, a value 3 representing that only the map images match is substituted into the mismatch level, and this procedure ends. In step S1706, a value 4 representing that even the map images do not match is substituted into the mismatch level, and this procedure ends.

When the mismatch detection method according to this embodiment is used, the match level of LDR meta-data can be known. The detectable editing level changes depending on the LDR meta-data. For this reason, even when mismatch is detected, HDR image display or LDR image display can be selected in accordance with the application purpose of the HDR image.

When map information does not match, it can be determined that the level of mismatch between the HDR information and the LDR image is considerably high, and HDR display is impossible. That is, the worth of HDR information as meta-data can be determined, and whether to store/delete HDR information can easily be judged. It is therefore possible to easily determine deletion of HDR information and reduce the file size.

Note that the mismatch portion of reduced images, edge images, or map images can be detected by a pixel position within the size of the LDR reduced image. When horizontal and vertical pixel positions where images are judged not to match are multiplied by N, the mismatch portion in the LDR image can be specified. Hence, a mark indicating the mismatch portion of reduced images, edge images, or map images may be superimposed on the LDR image in accordance with a user operation.

Second Embodiment

In the first embodiment, one of three kinds of operations, that is, HDR image display, LDR image display, and HDR information deletion is automatically selected using an allowable level of mismatch and a detected mismatch level. However, the mismatch level may be presented to the user to cause him/her to select one of the three kinds of operations.

For example, when hash values match, HDR display is performed without notifying the user, as described in the above embodiment. When hash values do not match, and mismatch cannot be detected by another LDR meta-data, that is, when the mismatch level is −1, for example, a dialogue as shown in FIG. 18A is displayed to cause the user to select the presence/absence of HDR display, and processing according to the selection is performed.

When hash values do not match, and the reduced image of LDR meta-data matches, that is, when the mismatch level is 1, for example, a dialogue as shown in FIG. 18B is displayed to cause the user to select the presence/absence of HDR display.

When the reduced image of LDR meta-data does not match, or the edge image of LDR meta-data matches, that is, when the mismatch level is 2, for example, a dialogue as shown in FIG. 18C is displayed to cause the user to select the presence/absence of HDR display.

When the edge image of LDR meta-data does not match, or the map image of LDR meta-data matches, that is, when the mismatch level is 3, for example, a dialogue as shown in FIG. 18D is displayed to cause the user to select the presence/absence of HDR display.

When the map image of LDR meta-data does not match, that is, when the mismatch level is 4, for example, a dialogue as shown in FIG. 18E is displayed to cause the user to select whether to delete HDR information.

Third Embodiment

In the above-described second embodiment, an HDR file including all types of LDR meta-data is received. When mismatch between HDR information and an LDR image is detected, the allowable level of mismatch is decided, and it is decided whether to display HDR or LDR.

However, when an HDR image encoding apparatus 201 performs only image processing with a small filter radius such as noise removal as editing of an LDR image, only a reduced image may be generated as LDR meta-data when permitting HDR display. That is, when only one type of LDR meta-data is included, and mismatch is detected by the LDR meta-data, the LDR meta-data is displayed. If no mismatch is detected, the HDR image is displayed.

Figure 19:
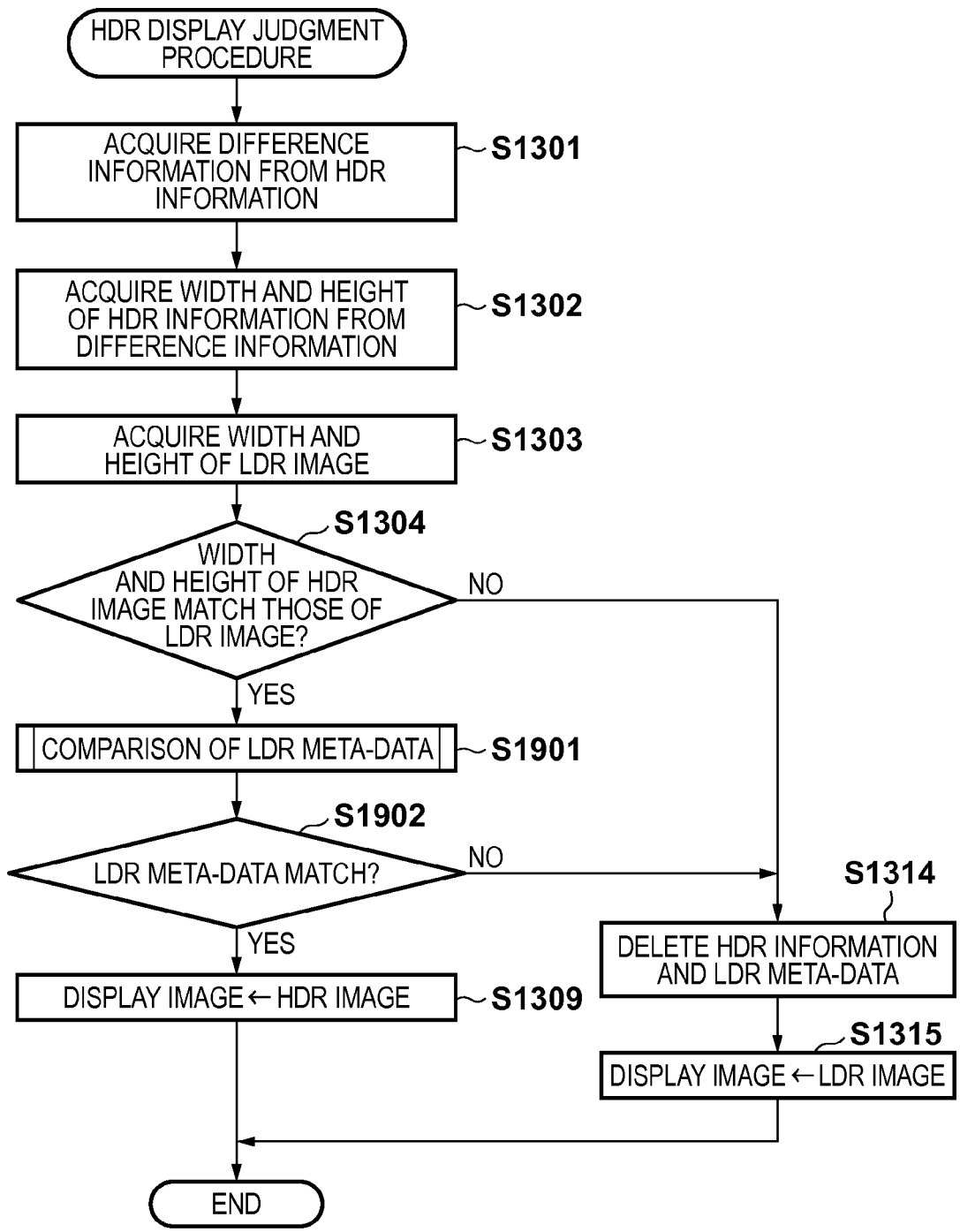
FIG. 19 is a flowchart of an HDR display judgment procedure.
Figure 20A:
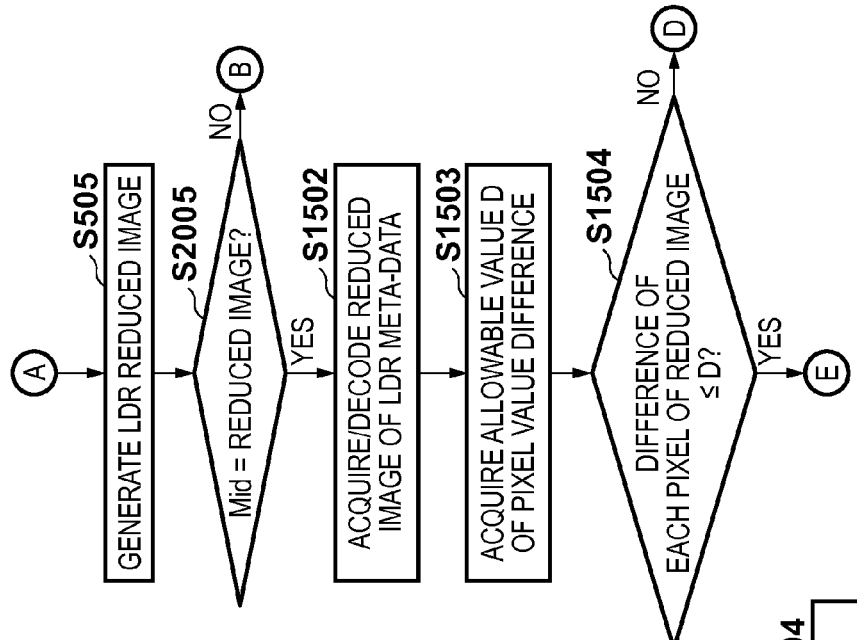
FIGS. 20A to 20D are flowcharts of an LDR meta-data comparison procedure.
Figure 20B:
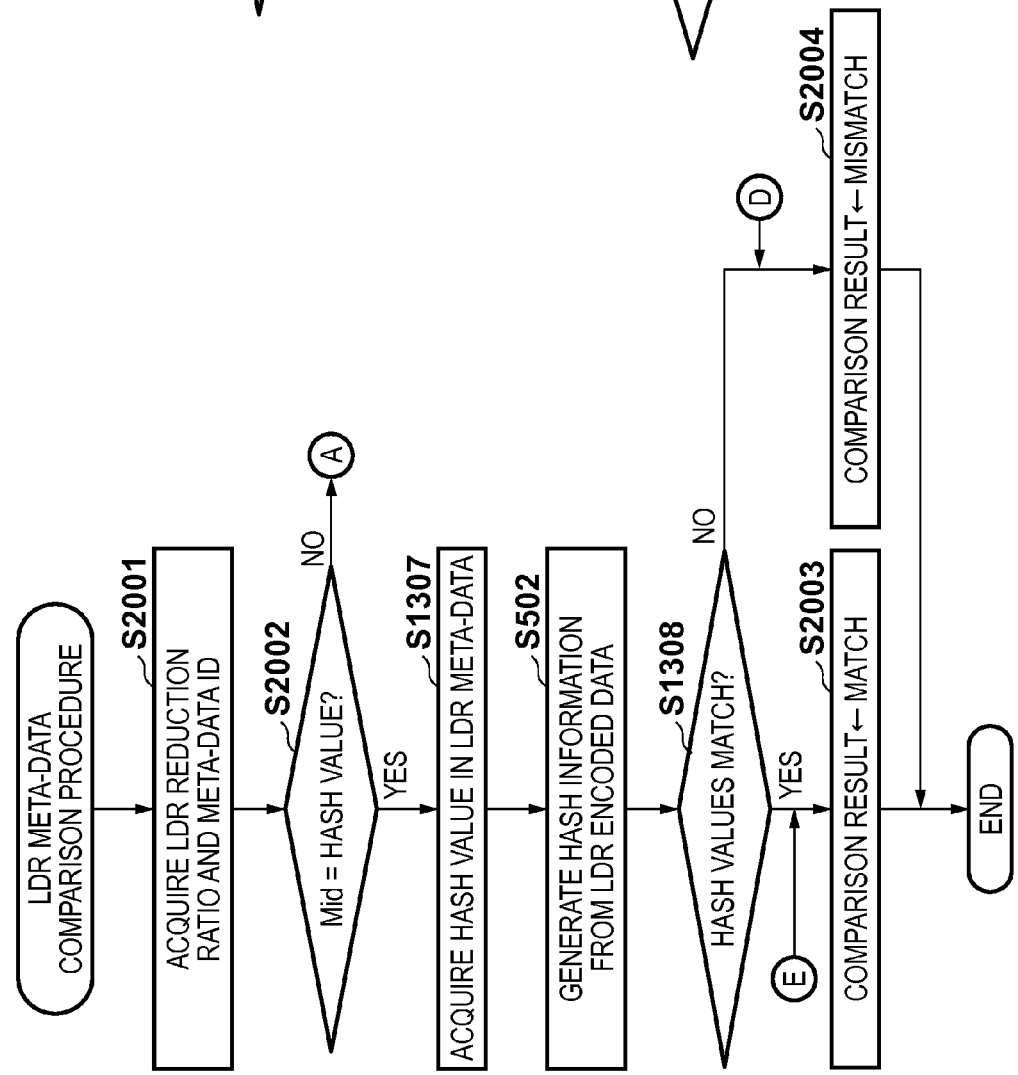
Figure 20D:
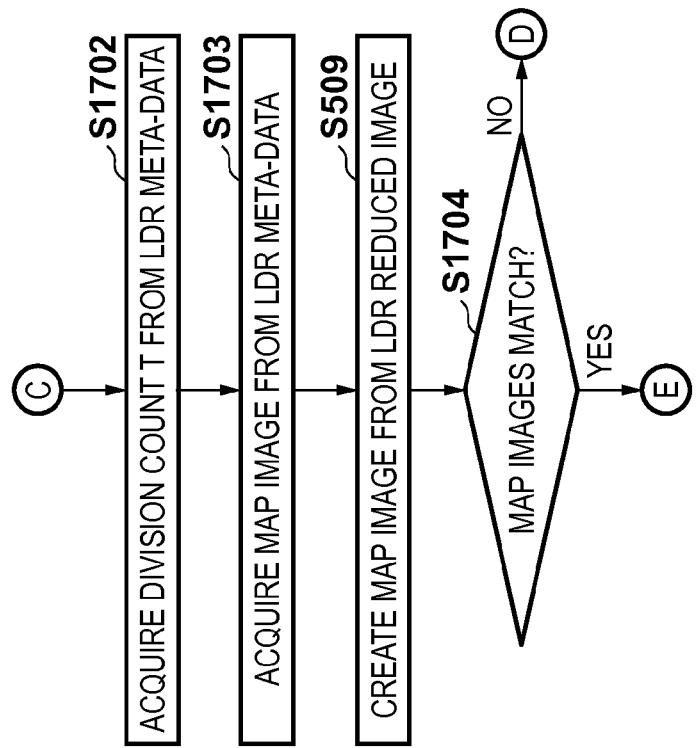
Figure 20C:
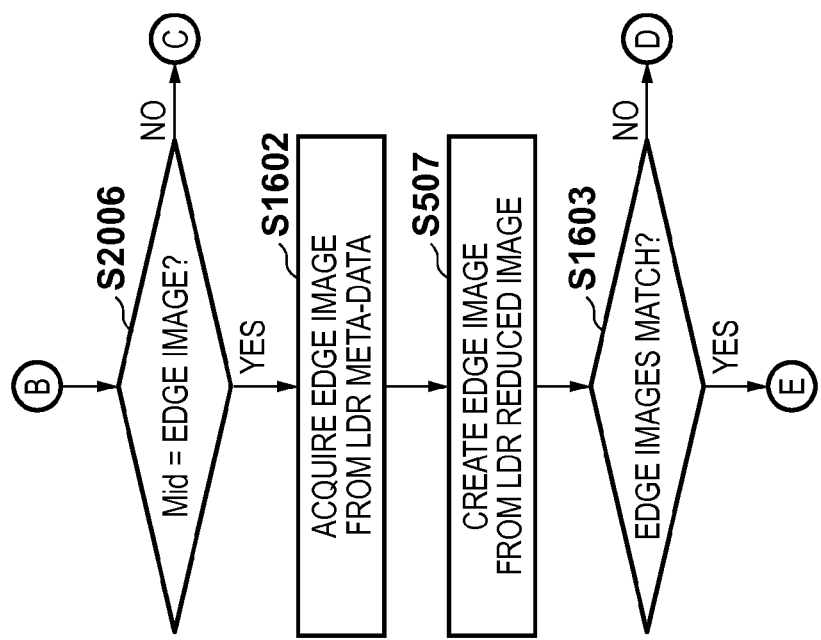

In the third embodiment, the operation of a decoding apparatus 203 upon receiving an HDR file storing only one type of LDR meta-data will be described with reference to FIG. 19. Note that the same step numbers as in the first and second embodiments denote steps to perform the same operations in FIG. 19, and a detailed description thereof will be omitted.

In steps S1301 to S1304, the same operations in the HDR display judgment procedure of the first embodiment are performed. If the horizontal and vertical sizes of HDR information and an LDR image do not match in step S1304, the process advances to step S1314. In step S1314, the HDR information and LDR meta-data are deleted from the HDR file, as in the second embodiment. After that, the process advances to step S1315 to select the LDR image as a display image, and this procedure ends. If the horizontal and vertical sizes match in step S1304, the process advances to step S1901. In step S1901, the LDR meta-data is compared with the JPEG-compressed LDR image in the HDR file. The comparison method will be described later in detail with reference to FIGS. 20A to 20D. In step S1901, a value representing match or mismatch is output as the comparison result. In step S1902, it is judged based on the result of step S1901 whether the LDR meta-data matches. That is, if the output result of step S1901 represents match, the process advances to step S1309. If mismatch, the process advances to step S1314. When the process advances to step S1314, the process then advances to step S1315, as described above, and this procedure ends. When the process advances to step S1309, an HDR image is selected as a display image, and this procedure ends.

An LDR meta-data comparison method will be described next with reference to FIGS. 20A to 20D. In step S2001, an LDR reduction ratio N and a meta-data ID are acquired from information of LDR meta-data in the HDR file. More specifically, HDR information is analyzed, and data is read in accordance with the format shown in FIG. 10A, and the LDR reduction ratio N and the meta-data ID are acquired from parameters Mr and Mid, respectively. In step S2002, it is determined whether the meta-data ID acquired in step S2001 indicates a hash value. In this embodiment, when Mid=0x00, it is determined that it indicates a hash value. The process advances to steps S1307, S502, and S1308 to check whether the hash value of the LDR meta-data matches a hash value generated from LDR encoded data. The operations of the steps are the same as those described in the first embodiment, and a detailed description thereof will be omitted here. If the hash values match in step S1308, the process advances to step S2003 to output match as the comparison result, and this procedure ends. If the hash values do not match in step S1308, the process advances to step S2004 to output mismatch as the comparison result, and this procedure ends.

If Mid indicates data other than a hash value in step S2002, the process advances to step S505. In step S505, an LDR reduced image is created using the LDR reduction ratio N acquired in step S2001 and the LDR image in the HDR file. In step S2005, it is determined whether the meta-data ID acquired in step S2001 indicates a reduced image. In this embodiment, when Mid=0x01, it is determined that it indicates a reduced image, and the process advances to step S1502. If Mid does not indicate a reduced image, the process advances to step S2006. The operations of steps S1502 to S1504 are the same as those in the first embodiment, and a description thereof will be omitted here. If the differences between the pixels of the reduced images are equal to or smaller than an allowable value represented by a threshold D in step S1504, it is determined that the reduced images match, and the process advances to step S2003. Otherwise, it is determined that the reduction results do not match, and the process advances to step S2004.

In step S2006, it is determined whether the meta-data ID acquired in step S2001 indicates an edge image. If the meta-data ID indicates an edge image, the process advances to step S1602. Otherwise, the process advances to step S1702. When the process advances to step S1602, the process then advances to steps S507 and S1603 to determine whether the edge image of the LDR meta-data matches an edge image created from the LDR image in the HDR file. This operation is the same as that described in the first embodiment. If it is determined in step S1603 that the edge images match, the process advances to step S2003. If it is determined that the edge images do not match, the process advances to step S2004.

When the process advances from step S2006 to step S1702, the LDR meta-data can be specified as a map image. The process advances to steps S1702, S1703, S509, and S1704 to determine whether the map image as the LDR meta-data matches a map image created from the LDR image in the HDR file. If the map images match, the process advances to step S2003. If the map images do not match, the process advances to step S2004.

As described above, it can be said that when there is only one type of LDR meta-data, the HDR image generating apparatus decides the mismatch detection level, as in the third embodiment. That is, if the LDR meta-data does not match, it can be determined that not the HDR image but the LDR image should be displayed. Hence, if LDR meta-data does not match, it can easily be supposed that HDR information is of no worth. It is therefore possible to delete HDR information from the file and reduce the file size.

In this embodiment, switching between LDR display and HDR display is automatically done depending on whether mismatch is detected by one type of LDR meta-data in the HDR file. However, a dialogue may be displayed as in the modification of the second embodiment. If one type of LDR meta-data in the HDR file does not match, this mismatch exceeds the allowable level of mismatch of the HDR creator, and HDR display is not performed. Hence, when mismatch is detected by LDR meta-data, a dialogue as shown in FIG. 18F may be displayed to cause the user to select to delete HDR information. A dialogue (FIGS. 18A to 18E) according to the mismatch level may be displayed, as a matter of course, as in the modification of the second embodiment.

Fourth Embodiment

In the first to third embodiments, an example has been described in which the LDR image editing apparatus 202 cannot interpret HDR data and edits only an LDR image. The HDR image decoding apparatus 203 detects resultant mismatch between the edited LDR image 209 and the HDR information 206, and discard of the HDR information 206 is decided/executed.

In the fourth embodiment, a case where an LDR image editing apparatus 202 can recognize HDR information but can edit only an LDR image will be described. The LDR image editing apparatus 202 according to this embodiment judges the mismatch level from HDR information in accordance with the editing contents of an LDR image and determines whether to delete the HDR information.

Figure 21:
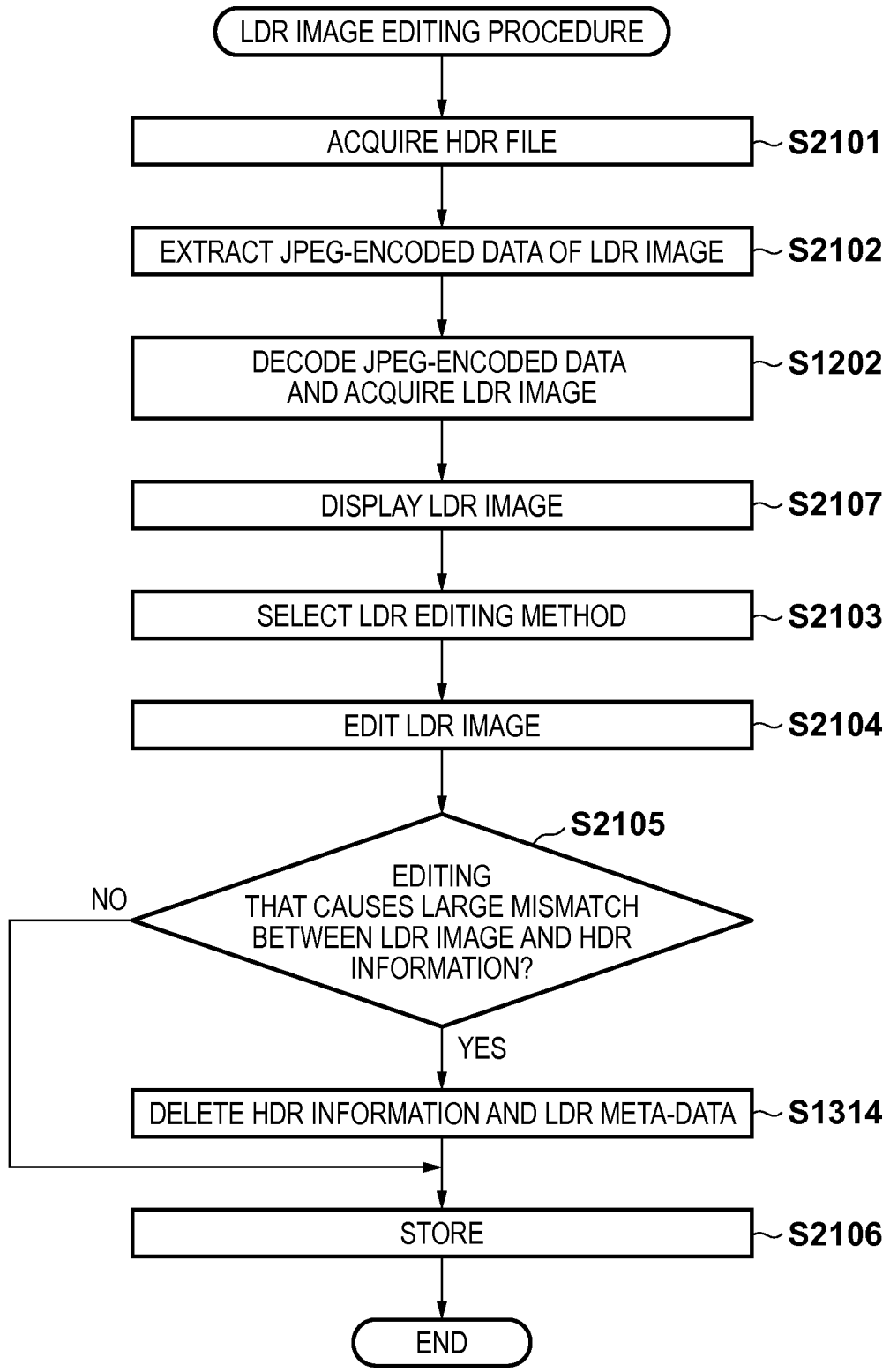
FIG. 21 is a flowchart of an LDR image editing procedure.

FIG. 21 is a flowchart showing the procedure of LDR image editing processing according to this embodiment. LDR image editing processing according to this embodiment will be described below with reference to FIG. 21. The same step numbers as in the first to third embodiments denote steps to perform the same operations in the following procedure, and a description thereof will be omitted here.

In step S2101, an editing target HDR file is acquired. In this embodiment, assume that an HDR file is acquired via a network. In step S2102, the format of the HDR file is interpreted, thereby acquiring JPEG encoded data of an LDR image. In step S1202, the JPEG encoded data acquired in step S2102 is decoded, and the LDR image is acquired. In step S2107, the LDR image decoded in step S2102 is displayed. In step S2103, an LDR image editing method is selected. In this embodiment, assume that three editing processes, that is, sharpness processing, noise removal, and edge preserving smoothing for the entire image are selectable. Various methods including a bilateral method have been proposed as processing methods of edge preserving smoothing. Any method is usable, and a bilateral filter is used in this embodiment. The user designates the editing method and its intensity from an input unit 302 such as a pointing system including, for example, a keyboard and a mouse. In step S2104, the LDR image decoded in step S1202 is edited using the editing method selected in step S2103. In step S2105, it is judged whether the editing processing performed in step S2104 makes mismatch large between the edited LDR image and HDR information stored in the file. In this embodiment, sharpness processing and noise removal are determined not to be editing processes that make mismatch large regardless of the intensity. Edge preserving smoothing is determined to be editing of small mismatch when the preserved edge intensity is smaller than a predetermined value. When the edge intensity is equal to or larger than the predetermined value, edge preserving smoothing is determined to be editing of large mismatch. This is because if the preserved edge intensity is higher than a certain level, a kind of subtractive color processing is applied, and an image like a CG or oil painting is obtained. Note that a table used to judge the level of mismatch (a type of editing that causes mismatch by itself, and when mismatch takes place depending on the editing level of an editing item, like edge enhancement, a threshold at which the mismatch is assumed to occur) is prepared, and judgment is done based on the table. If it is determined in step S2105 that the editing makes mismatch large, the process advances to step S1314. Otherwise, the process advances to step S2106. In step S1314, the HDR information and the LDR meta-data are deleted. In this embodiment, HDR information can be deleted by deleting all APP11 markers stored in the HDR file. When all APP11 markers are deleted, LDR meta-data stored together with the HDR information is also deleted at the same time. In step S2106, the file is stored, and the processing ends. On the other hand, if NO in step S2105, the process of step S1314 is skipped. Hence, the edited image is stored in one file as JPEG data while maintaining the HDR information and LDR meta-data.

The LDR image editing apparatus according to this embodiment can recognize the presence of HDR information but cannot edit it. This LDR image editing apparatus edits only an LDR image and, after that, judges mismatch to accompanying HDR information. If mismatch between the HDR information and the edited LDR image is determined to be large to some extent, the portion of the HDR information is deleted before encoded data is output to another apparatus. This obviates the necessity of causing another apparatus (decoding apparatus 203) that has received the edited file to do various kinds of control described above using LDR meta-data.

Fifth Embodiment

Figure 22:
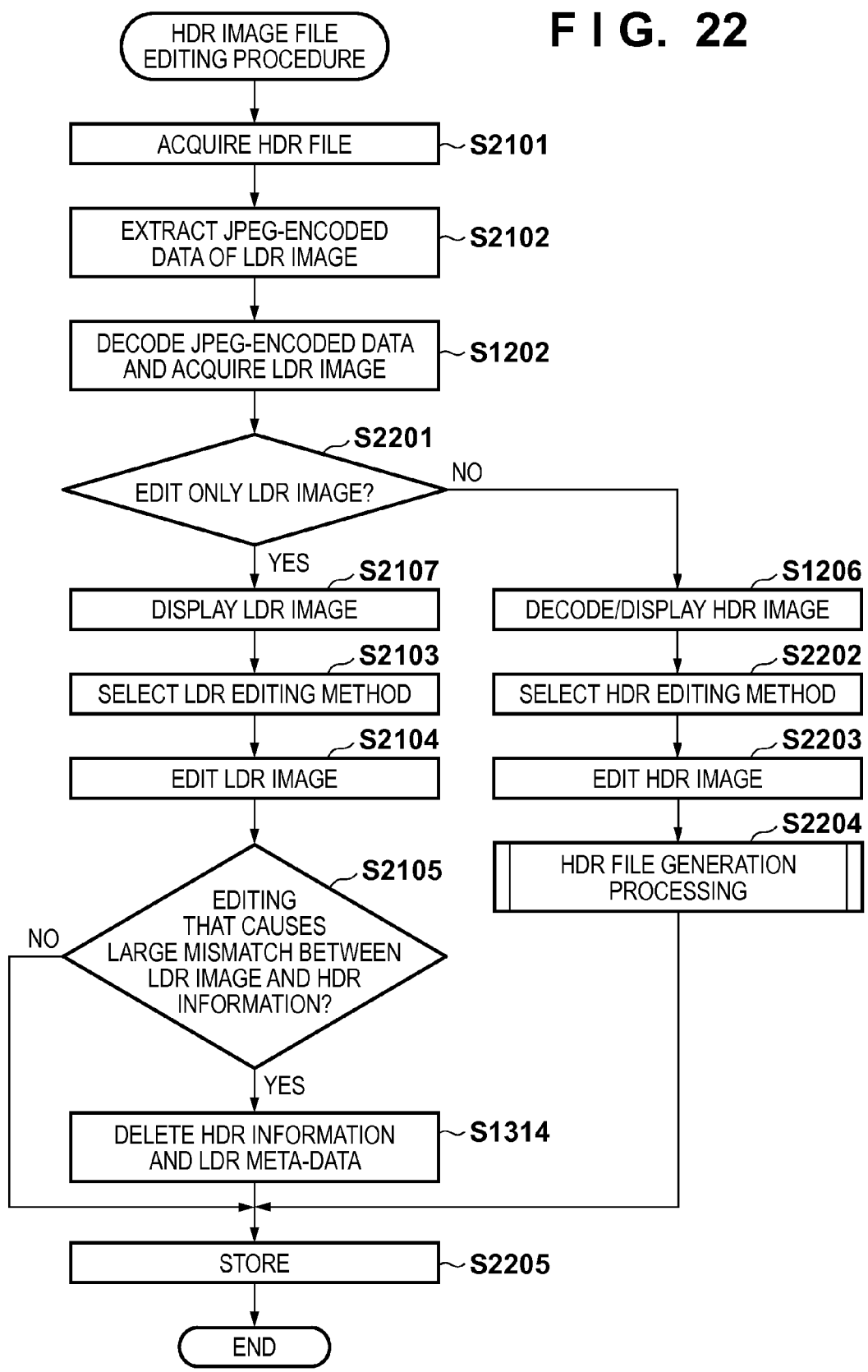
FIG. 22 is a flowchart of an HDR image file image editing procedure.

In the fourth embodiment, a case where the LDR image editing apparatus 202 can recognize the presence of HDR information but can edit only an LDR has been described. However, the present invention is not limited to this. For example, the present invention is also applicable to a case where the apparatus can recognize the presence of HDR information and also edit it, but edits only LDR due to some reason. More specifically, a case can be assumed where a power saving mode operates on a mobile terminal, and only display/editing of an LDR image is possible. FIG. 22 is a flowchart showing the procedure of editing processing in that case. LDR image editing processing according to the fifth embodiment will be described below with reference to FIG. 22.

The same step numbers as in the fourth embodiment denote steps to perform the same operations in the following procedure, and a description thereof will be omitted here.

In step S2101, an HDR file is acquired. In step S2102, JPEG encoded data of an LDR image is extracted from the HDR file. In step S1202, the JPEG encoded data extracted in step S2102 is decoded, and the LDR image is acquired. In step S2201, it is determined whether to edit only the LDR image. In this embodiment, when the apparatus is operating in the power saving mode, it is determined to edit only the LDR image, and the process advances to step S2107. When the apparatus is operating not in the power saving mode but in a normal mode, it is determined to edit not the LDR image but an HDR image, and the process advances to step S1206. The operations of steps S2107 to S1314 are the same as those in the fourth embodiment, and a description thereof will be omitted here. When the process advances from step S2201 to step S1206, inverse tone mapping is performed for the LDR image, and an HDR image is decoded using HDR information and the image obtained by inverse tone mapping and displayed. In step S2202, an HDR image editing method is selected. In this embodiment, assume that five editing processes, that is, sharpness processing, noise removal, edge preserving smoothing, gamma correction processing, and distortion correction for the entire HDR image are selectable. The user designates the editing method and its intensity, parameters, and the like from an input unit 302 such as a pointing system including, for example, a keyboard and a mouse. In step S2203, the HDR image is edited using the editing method selected in step S2202. In step S2204, an HDR file is generated from the edited HDR image obtained in step S2203. The process of step S2204 is the same as the processing procedure of FIG. 4, and a description thereof will be omitted here. Finally, in step S2205, the editing result is stored in a storage medium as a file, and the processing ends.

Sixth Embodiment

In the fifth embodiment, whether to delete HDR information is judged in the power saving mode depending on the editing method and its intensity. However, it is also effective to fix the editing method so as to obviate the necessity of deleting HDR information. For example, in the power saving mode, only sharpness processing and noise removal may be selectable as an editing method without necessity of deleting HDR information.

The power saving mode has been exemplified as the case where only display/editing of an LDR image is possible. However, the present invention is not limited to this. The present invention is also applicable to a case where only an LDR image can be displayed/edited due to another reason, for example, a case where a capacity for an HDR image cannot be ensured on the memory, as a matter of course.

OTHER EMBODIMENTS

In this embodiment, when creating a reduced image, the average value of N×N [pixels] is used as one pixel. However, the median of the pixel values of N×N pixels may be used. When the median is used, the time required to create an LDR reduced image can be shortened. In this case, if a pixel value changed by filter processing is located near the median, the reduced image slightly changes from the image before filter processing. Hence, at the time of mismatch level judgment, the pixel value tolerance needs to be wider than that for the average value.

A plurality of methods of calculating the value of one pixel from an N×N pixel block may be available. In this case, the identifier of the calculation method should also be output to the information of LDR meta-data. The identifier can be output to the start (the start of Mcontents) of the encoded data of the reduced image or included in Mid using four upper bits of meta-data ID.

In this embodiment, a Sobel filter more oriented to a pixel of interest is used at the time of edge image creation. However, a simpler Prewitt filter may be used as a predetermined edge detection filter. A plurality of edge detection filters may be usable. In this case, the identifier of the edge detection filter should also be output to the information of LDR meta-data. The identifier can be output to the start (the start of Mcontents) of the encoded data of the edge image or included in Mid using four upper bits of meta-data ID.

In this embodiment, the edge image or map image as LDR meta-data is stored in an HDR file without being compressed. However, these data may be compressed and stored. When LDR meta-data is compressed, the size of the LDR meta-data can be reduced, although time is required to generate or read it out. Note that as the compression method, a lossless compression method such as run-length encoding is preferably used. When a plurality of methods are usable to compress the edge image or map image, an identifier uniquely indicating the used compression method should be output. The identifier can be output to the start (the start of Mcontents) of the encoded data of the edge image or included in Mid using four upper bits of meta-data ID.

When the reduced image of an LDR image is used as LDR image meta-data, JPEG that is the same encoding method as that of the LDR image is used as the LDR meta-data encoding method, thereby supporting only one compression method at the time of encoding and decoding.

When the reduced image of an LDR image is used as LDR image meta-data, the JPEG 2000 encoding method may be used. When using the JPEG 2000 encoding method, the HDR image encoding apparatus and decoding apparatus need to support both JPEG that is the encoding method of an LDR image and JPEG 2000 that is the encoding method of LDR image meta-data. However, a resolution level to be used to detect mismatch can be selected on the decoding side. For example, assume a case where an LDR reduced image using reduction ratio N=8 is converted into JPEG 2000 encoded data having two resolution levels of 0 and 1. Since the decoding result of the low resolution level 0 is the same as the image size at reduction ratio N=16, editing processing of using filter radius of 16 or less cannot be detected. On the other hand, since the decoding result of the high resolution level 1 is the same as the image size at reduction ratio N=8, editing processing using a filter radius larger than 8 can be detected, although editing processing using a filter radius of 8 or less cannot be detected. That is, when mismatch detection is performed using the decoding result of the low resolution level, editing using a filter radius larger than the reduction ratio N is not detected as a mismatch. In this way, the mismatch detection level can easily be changed on the decoding side.

Note that in this embodiment, an example in which HDR information and LDR image meta-data are stored in an APP11 marker has been described. However, the storage destination APP marker is not limited to APP11. The LDR meta-data storage destination need only be the same APP marker as HDR information.

In this embodiment, a hash value is used as meta-data to verify the identity of LDR encoded data. However, part of LDR encoded data and the position of the data (offset value from the start of encoded data) may be used. LDR encoded data uses JPEG encoding that is lossy compression. For this reason, the encoded data changes before and after recompression. Hence, even when simple data such as part of encoded data and its offset is used, the identity of encoded data can be verified.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2013-145844, filed Jul. 11, 2013, and 2014-048074, filed Mar. 11, 2014, which are hereby incorporated by reference herein in their entirety.

What is claimed is:

1. An image encoding apparatus for encoding a High Dynamic Range image, comprising:
an input unit configured to input the High Dynamic Range image of an encoding target;
a generating unit configured to generate, from the input High Dynamic Range image, a Low Dynamic Range image and difference information representing a difference between the Low Dynamic Range image and the High Dynamic Range image;
an encoding unit configured to encode the Low Dynamic Range image generated by the generating unit;
a calculating unit configured to calculate, as Low Dynamic Range meta-data, information formed from data representing a feature of the Low Dynamic Range image; and
a file generating unit configured to generate a High Dynamic Range encoded file by storing encoded data of the Low Dynamic Range image generated by the encoding unit in a main encoded data storage region of a file structure for the Low Dynamic Range image and storing the difference information and the Low Dynamic Range meta-data in a marker defined as a non-reference region for a Low Dynamic Range image decoding apparatus in the file structure;
a memory storing a program; and
a processor configured to function as at least one of the units by executing the program stored in the memory, wherein the calculating unit includes a reducing unit configured to generate one representative pixel from n×m pixels in the Low Dynamic Range image, thereby generating a Low Dynamic Range reduced image from the representative pixel, wherein n and m are each equal to or greater than 1,
wherein the encoding unit encodes the Low Dynamic Range reduced image as well, and
the file generating unit stores encoded data of the Low Dynamic Range reduced image in the marker as the Low Dynamic Range meta-data and generates the High Dynamic Range encoded file.

2. The apparatus according to claim 1, wherein the encoding unit encodes the difference information as well.

3. The apparatus according to claim 1, further comprising a hash value calculating unit configured to calculate a hash value from the Low Dynamic Range image,
wherein the file generating unit stores the hash value in the marker as well.

4. The apparatus according to claim 1, wherein the calculating unit includes an edge image generating unit configured to generate, as the Low Dynamic Range meta-data, an edge image representing whether each pixel of the Low Dynamic Range reduced image is an edge pixel.

5. The apparatus according to claim 1, wherein the calculating unit includes a meta-data generating unit configured to generate, as the Low Dynamic Range meta-data, a map image by dividing a dynamic range of the High Dynamic Range image by a preset division count, adding a number to a corresponding section of each pixel value of the Low Dynamic Range image corresponding to each divided section, and replacing the pixel value of the Low Dynamic Range image with the number of the corresponding section.

6. An image decoding apparatus for decoding a High Dynamic Range encoded file, comprising:
a decoding unit configured to decode encoded data of a Low Dynamic Range image stored in a main encoded data storage region of a file structure for the Low Dynamic Range image in the High Dynamic Range encoded file;
an extracting unit configured to extract Low Dynamic Range meta-data and difference information representing a difference between the Low Dynamic Range image and a High Dynamic Range image from a marker defined as a non-reference region for a Low Dynamic Range image decoding apparatus in the file structure;
a generating unit configured to generate the Low Dynamic Range meta-data from the Low Dynamic Range image decoded by the decoding unit;
a specifying unit configured to specify a state in which the Low Dynamic Range image decoded by the decoding unit is edited from an original Low Dynamic Range image using meta-data generated by the generating unit and the meta-data extracted by the extracting unit;
an output control unit configured to select based on the specifying result whether to generate and output the High Dynamic Range image from the difference information and the Low Dynamic Range image decoded by the decoding unit or output the Low Dynamic Range image decoded by the decoding unit;
a memory storing a program; and
a processor configured to function as at least one of the units by executing the program stored in the memory.

7. The apparatus according to claim 6, further comprising an a Low Dynamic Range image judging unit configured to, when a hash value is stored in the marker, extract the hash value, calculate a hash value from the Low Dynamic Range image decoded by the decoding unit, compare the hash values, and when the hash values match, omitting judgment processing by the judging unit and judging that the Low Dynamic Range image decoded by the decoding unit remains unchanged from the original Low Dynamic Range image.

8. The apparatus according to claim 6, wherein the specifying unit
extracts and decodes encoded data of a Low Dynamic Range reduced image from the marker,
generates the Low Dynamic Range reduced image from the Low Dynamic Range image decoded by the decoding unit,
judges whether a pixel value difference between the decoded Low Dynamic Range reduced image and the Low Dynamic Range reduced image obtained by reduction is not more than a preset allowable value, and
when the difference is not more than the allowable value, judges that editing within a preset allowable range has been performed for the Low Dynamic Range image obtained by the decoding unit.

9. The apparatus according to claim 6, wherein the specifying unit
extracts an edge image from the marker,
generates the edge image from the Low Dynamic Range image decoded by the decoding unit,
judges whether pixel values of the extracted edge image match the pixel values of the generated edge image, and
upon judging that the pixel values match, judges that editing within a preset allowable range has been performed for the Low Dynamic Range image obtained by the decoding unit.

10. The apparatus according to claim 6, wherein the specifying unit
extracts a map image from the marker,
generates, as the Low Dynamic Range meta-data, the map image by dividing a dynamic range of the High Dynamic Range image by a preset division count, adding a number to a corresponding section of each pixel value of the Low Dynamic Range image corresponding to each divided section, and replacing the pixel value of the Low Dynamic Range image with the number of the corresponding section,
judges whether pixel values of the extracted map image match the pixel values of the generated map image, and
upon judging that the pixel values match, judges that editing within a preset allowable range has been performed for the Low Dynamic Range image obtained by the decoding unit.

11. The apparatus according to claim 6, further comprising a display control unit configured to perform display to cause a user to select based on the specifying result whether to generate and output the High Dynamic Range image from the difference information and the Low Dynamic Range image decoded by the decoding unit or output the Low Dynamic Range image decoded by the decoding unit.

12. A control method of an image encoding apparatus for encoding a High Dynamic Range image, comprising:
inputting the High Dynamic Range image of an encoding target;
generating, from the input High Dynamic Range image, a Low Dynamic Range image and difference information representing a difference between the Low Dynamic Range image and the High Dynamic Range image;
encoding the generated Low Dynamic Range image;
calculating information formed from data representing a feature of the Low Dynamic Range image as Low Dynamic Range meta-data; and
generating a High Dynamic Range encoded file by storing encoded data of the Low Dynamic Range image in a main encoded data storage region of a file structure for the Low Dynamic Range image and storing the difference information and the Low Dynamic Range meta-data in a marker defined as a non-reference region for a Low Dynamic Range image decoding apparatus in the file structure,
wherein in the calculating, one representative pixel is generated from n×m pixels in the Low Dynamic Range image to generate a Low Dynamic Range reduced image from the representative pixel, wherein n and m are each equal to or greater than 1,
wherein in the encoding, the Low Dynamic Range reduced image is encoded as well, and
in the generating the High Dynamic Range encoded file, the encoded data of the Low Dynamic Range reduced image is stored in the marker as the Low Dynamic Range meta-data to generate the High Dynamic Range encoded file.

13. A control method of an image decoding apparatus for decoding a High Dynamic Range encoded file, comprising:
a decoding step of decoding encoded data of a Low Dynamic Range image stored in a main encoded data storage region of a file structure for the Low Dynamic Range image in the High Dynamic Range encoded file;
extracting Low Dynamic Range meta-data and difference information representing a difference between the Low Dynamic Range image and a High Dynamic Range image from a marker defined as a non-reference region for a Low Dynamic Range image decoding apparatus in the file structure;
generating the Low Dynamic Range meta-data from the decoded Low Dynamic Range image;
specifying a state in which the decoded Low Dynamic Range image is edited from an original Low Dynamic Range image using the generated meta-data and the extracted meta-data; and
selecting based on the specifying result whether to generate and output the High Dynamic Range image from the difference information and the decoded Low Dynamic Range image or output the decoded Low Dynamic Range image.

14. A non-transitory computer-readable storage medium storing a program that is loaded and executed by a computer so as to execute each step of a control method of an image encoding apparatus for encoding a High Dynamic Range image, the control method comprising:
inputting the High Dynamic Range image of an encoding target;
generating, from the input High Dynamic Range image, a Low Dynamic Range image and difference information representing a difference between the Low Dynamic Range image and the High Dynamic Range image;
encoding the generated Low Dynamic Range image;
calculating information formed from data representing a feature of the Low Dynamic Range image as Low Dynamic Range meta-data; and
a High Dynamic Range encoded file by storing encoded data of the Low Dynamic Range image in a main encoded data storage region of a file structure for the Low Dynamic Range image and storing the difference information and the Low Dynamic Range meta-data in a marker defined as a non-reference region for an Low Dynamic Range image decoding apparatus in the file structure, wherein in the calculating, one representative pixel is generated from n×m pixels in the Low Dynamic Range image to generate a Low Dynamic Range reduced image from the representative pixel, wherein n and m are each equal to or greater than 1, wherein in the encoding, the Low Dynamic Range reduced image is encoded as well, and in the generating the High Dynamic Range encoded file, the encoded data of the Low Dynamic Range reduced image is stored in the marker as the Low Dynamic Range meta-data to generate the High Dynamic Range encoded file.

15. A non-transitory computer-readable storage medium storing a program that is loaded and executed by a computer so as to execute each step of a control method of an image decoding apparatus for decoding a High Dynamic Range encoded file, the method comprising:

a decoding step of decoding encoded data of a Low Dynamic Range image stored in a main encoded data storage region of a file structure for the Low Dynamic Range image in High Dynamic Range encoded file;

an extracting step of extracting Low Dynamic Range meta-data and difference information representing a difference between the Low Dynamic Range image and a High Dynamic Range image from a marker defined as a non-reference region for a Low Dynamic Range image decoding apparatus in the file structure;

generating the Low Dynamic Range meta-data from the decoded Low Dynamic Range image;

specifying a state in which the decoded Low Dynamic Range image is edited from an original Low Dynamic Range image using the generated meta-data and the extracted meta-data; and selecting based on the specifying result whether to generate and output the High Dynamic Range image from the difference information and the decoded Low Dynamic Range image or output the decoded Low Dynamic Range image.

16. An image processing apparatus for editing a Low Dynamic Range image stored in High Dynamic Range extension data in a file, comprising:

an input unit configured to input encoded data of the file of an editing target;

a Low Dynamic Range decoding unit configured to extract and decode encoded data of a Low Dynamic Range image included in the encoded data, thereby generating the Low Dynamic Range image;

an editing unit configured to edit the Low Dynamic Range image decoded by the Low Dynamic Range decoding unit;

a specifying unit configured to specify High Dynamic Range extension data that is included in the encoded data and is necessary to reconstruct the High Dynamic Range image by combination with the Low Dynamic Range image;

a determining unit configured to determine whether to delete the High Dynamic Range extension data in accordance with editing contents of the Low Dynamic Range image, by comparing the edited Low Dynamic Range image with the High Dynamic Range extension data;

a deleting unit configured to delete the High Dynamic Range extension data when the determining unit determines to delete the High Dynamic Range extension data, a memory storing a program; and a processor configured to function as at least one of the units by executing the program stored in the memory.

17. A control method of an image processing apparatus for editing a Low Dynamic Range image stored in High Dynamic Range extension data in a file, comprising:

inputting encoded data of the file of an editing target;

extracting and decoding encoded data of a Low Dynamic Range image included in the encoded data, thereby generating the Low Dynamic Range image;

editing the Low Dynamic Range image;

specifying High Dynamic Range extension data that is included in the encoded data and is necessary to reconstruct the High Dynamic Range image by combination with the Low Dynamic Range image;

determining whether to delete the High Dynamic Range extension data in accordance with editing contents of the Low Dynamic Range image, by comparing the edited Low Dynamic Range image with the High Dynamic Range extension data; and deleting the High Dynamic Range extension data when it is determined to delete the High Dynamic Range extension data in the determining step.

18. A non-transitory computer-readable storage medium storing a program that is loaded and executed by a computer so as to execute each step of a control method of an image processing apparatus for editing a Low Dynamic Range image stored in High Dynamic Range extension data in a file, comprising:

inputting encoded data of the file of an editing target;

extracting and decoding encoded data of a Low Dynamic Range image included in the encoded data, thereby generating the Low Dynamic Range image;

editing the Low Dynamic Range image;

specifying High Dynamic Range extension data that is included in the encoded data and is necessary to reconstruct the High Dynamic Range image by combination with the Low Dynamic Range image;

determining whether to delete the High Dynamic Range extension data in accordance with editing contents of the Low Dynamic Range image, by comparing the edited Low Dynamic Range image with the High Dynamic Range extension data and deleting the High Dynamic Range extension data when it is determined to delete the High Dynamic Range extension data in the determining step.

19. An image encoding apparatus for encoding a High Dynamic Range image, comprising:

an input unit configured to input the High Dynamic Range image of an encoding target;

a generating unit configured to generate, from the input High Dynamic Range image, a Low Dynamic Range image and difference information representing a difference between the Low Dynamic Range image and the High Dynamic Range image;

an encoding unit configured to encode the Low Dynamic Range image generated by the generating unit;

a calculating unit configured to calculate, as Low Dynamic Range meta-data, information formed from data representing a feature of the Low Dynamic Range image;

a file generating unit configured to generate a High Dynamic Range encoded file by storing encoded data of the Low Dynamic Range image generated by the encoding unit in a main encoded data storage region of a file structure for the Low Dynamic Range image and storing the difference information and the Low Dynamic Range meta-data in a marker defined as a non-reference region for a Low Dynamic Range image decoding apparatus in the file structure;

a memory storing a program; and a processor configured to function as at least one of the units by executing the program stored in the memory, wherein the calculating unit includes an edge image generating unit configured to generate, as the Low Dynamic Range meta-data, an edge image representing whether each pixel of a Low Dynamic Range reduced image is an edge pixel, by generating one representative pixel from n×m pixels in the Low Dynamic Range image, wherein n and m are each equal to or greater than 1, wherein the encoding unit encodes the edge image as well, and the file generating unit stores encoded data of the edge image in the marker as the Low Dynamic Range meta-data and generates the High Dynamic Range encoded file.

20. An image encoding apparatus for encoding a High Dynamic Range image, comprising:

an input unit configured to input the High Dynamic Range image of an encoding target;

a generating unit configured to generate, from the input High Dynamic Range image, a Low Dynamic Range image and difference information representing a difference between the Low Dynamic Range image and the High Dynamic Range image;

an encoding unit configured to encode the Low Dynamic Range image generated by the generating unit;

a calculating unit configured to calculate, as Low Dynamic Range meta-data, information formed from data representing a feature of the Low Dynamic Range image;

a file generating unit configured to generate a High Dynamic Range encoded file by storing encoded data of the Low Dynamic Range image generated by the encoding unit in a main encoded data storage region of a file structure for the Low Dynamic Range image and storing the difference information and the Low Dynamic Range meta-data in a marker defined as a non-reference region for a Low Dynamic Range image decoding apparatus in the file structure;

a memory storing a program; and a processor configured to function as at least one of the units by executing the program stored in the memory, wherein the calculating unit includes a meta-data generating unit configured to generate, as the Low Dynamic Range meta-data, a map image by dividing a dynamic range of the High Dynamic Range image by a preset division count into sections, adding a number to a corresponding section of each pixel value of the Low Dynamic Range image corresponding to each divided section, and replacing the pixel value of the Low Dynamic Range image with the number of the corresponding section.

* * * * *